United States Patent
Kamae et al.

(10) Patent No.: US 11,675,283 B2
(45) Date of Patent: Jun. 13, 2023

(54) MAGNETIC CARRIER, TWO-COMPONENT DEVELOPER, AND METHOD FOR PRODUCING MAGNETIC CARRIER

(71) Applicant: CANON KABUSHIKI KAISHA, Tokyo (JP)

(72) Inventors: Kentaro Kamae, Kanagawa (JP); Kazuhisa Shirayama, Chiba (JP); Takeshi Hashimoto, Ibaraki (JP); Takeshi Ohtsu, Ibaraki (JP); Hayato Ida, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 5 days.

(21) Appl. No.: 17/092,602

(22) Filed: Nov. 9, 2020

(65) Prior Publication Data

US 2021/0141315 A1    May 13, 2021

(30) Foreign Application Priority Data

Nov. 13, 2019  (JP) .............................. JP2019-205634

(51) Int. Cl.
  *G03G 9/083* (2006.01)
  *G03G 9/093* (2006.01)
  (Continued)

(52) U.S. Cl.
  CPC ......... *G03G 9/0833* (2013.01); *C09D 133/08* (2013.01); *C09D 183/04* (2013.01); (Continued)

(58) Field of Classification Search
  CPC .. G03G 9/0833; G03G 9/0837; G03G 9/0838; G03G 9/0839; G03G 9/09321; G03G 9/09328; G03G 9/09385
  See application file for complete search history.

(56) References Cited

U.S. PATENT DOCUMENTS

| 8,084,174 B2 | 12/2011 | Hasegawa et al. |
| 8,211,610 B2 | 7/2012 | Yamaguchi et al. |

(Continued)

FOREIGN PATENT DOCUMENTS

| JP | H1090953 A | 10/1998 |
| JP | 2005010183 A | 1/2005 |

(Continued)

OTHER PUBLICATIONS

U.S. Appl. No. 17/002,879, Takaho Shibata, filed Aug. 26, 2020.

(Continued)

*Primary Examiner* — Peter L Vajda
*Assistant Examiner* — Boone Alexander Evans
(74) *Attorney, Agent, or Firm* — Venable LLP

(57) ABSTRACT

A magnetic carrier including a magnetic carrier particle having a magnetic core particle and a coating layer of an organosilicon polymer on a surface of the magnetic core particle, wherein the organosilicon polymer has the structure given by formula (T3) below; in $^{29}$Si-NMR measurement of the THF-insoluble matter of the organosilicon polymer, the ratio ST3 of the peak area for the structure given by formula (T3) to the total peak area for the organosilicon polymer is at least 0.05; and in the roughness curve measured on the magnetic carrier particle, the mean width (RSm) of the roughness curve elements of the magnetic carrier particle, and the ratio (σ/RSm) to this RSm of the standard deviation σ of the width of the region where one period of a protrusion and a recess occurs, are in prescribed ranges.

$$R\text{—}Si(O_{1/2})_3 \tag{T3}$$

R in the formula represents a prescribed substituent.

11 Claims, 1 Drawing Sheet

(51) Int. Cl.
*C09D 133/08* (2006.01)
*C09D 183/04* (2006.01)
*C09D 5/00* (2006.01)

(52) U.S. Cl.
CPC ......... *G03G 9/0837* (2013.01); *G03G 9/0838* (2013.01); *G03G 9/0839* (2013.01); *G03G 9/09321* (2013.01); *G03G 9/09328* (2013.01); *G03G 9/09385* (2013.01); *C09D 5/002* (2013.01)

(56) References Cited

U.S. PATENT DOCUMENTS

| | | | |
|---|---|---|---|
| 8,263,302 B2 * | 9/2012 | Moriya | G03G 9/1133 430/111.3 |
| 8,288,069 B2 | 10/2012 | Fujikawa et al. | |
| 8,323,726 B2 | 12/2012 | Naka et al. | |
| 8,921,023 B2 | 12/2014 | Baba et al. | |
| 8,927,188 B2 | 1/2015 | Naka et al. | |
| 8,974,994 B2 | 3/2015 | Kamae et al. | |
| 8,986,914 B2 | 3/2015 | Fujikawa et al. | |
| 9,057,970 B2 | 6/2015 | Ida et al. | |
| 9,058,924 B2 | 6/2015 | Komatsu et al. | |
| 9,063,443 B2 | 6/2015 | Ishigami et al. | |
| 9,075,328 B2 | 7/2015 | Minagawa et al. | |
| 9,152,088 B1 | 10/2015 | Kobori et al. | |
| 9,348,247 B2 | 5/2016 | Ida et al. | |
| 9,348,253 B2 | 5/2016 | Kanno et al. | |
| 9,372,420 B2 | 6/2016 | Mizo et al. | |
| 9,417,540 B2 | 8/2016 | Hashimoto et al. | |
| 9,436,112 B2 | 9/2016 | Iwasaki et al. | |
| 9,540,483 B2 | 1/2017 | Ida et al. | |
| 9,651,883 B2 | 5/2017 | Hama et al. | |
| 9,665,021 B2 | 5/2017 | Ohtsu et al. | |
| 9,665,023 B2 | 5/2017 | Kamae et al. | |
| 9,665,026 B2 | 5/2017 | Iwasaki et al. | |
| 9,671,707 B2 | 6/2017 | Minagawa et al. | |
| 9,696,644 B2 | 7/2017 | Ida et al. | |
| 9,897,934 B2 | 2/2018 | Tamura et al. | |
| 9,915,885 B2 | 3/2018 | Katsumata et al. | |
| 9,969,834 B2 | 5/2018 | Ohtsu et al. | |
| 10,012,918 B2 | 7/2018 | Ishigami et al. | |
| 10,012,920 B2 | 7/2018 | Shibata et al. | |
| 10,012,921 B2 | 7/2018 | Kamae et al. | |
| 10,036,970 B2 | 7/2018 | Kanno et al. | |
| 10,054,868 B2 | 8/2018 | Kishida et al. | |
| 10,078,281 B2 | 9/2018 | Ida et al. | |
| 10,082,743 B2 | 9/2018 | Hama et al. | |
| 10,088,765 B2 | 10/2018 | Miyakai et al. | |
| 10,133,201 B2 | 11/2018 | Kamae et al. | |
| 10,146,146 B2 | 12/2018 | Komatsu et al. | |
| 10,175,595 B2 | 1/2019 | Onozaki et al. | |
| 10,197,936 B2 | 2/2019 | Onozaki et al. | |
| 10,203,619 B2 | 2/2019 | Yamashita et al. | |
| 10,216,108 B2 | 2/2019 | Iwasaki et al. | |
| 10,228,629 B2 | 3/2019 | Tamura et al. | |
| 10,234,777 B2 | 3/2019 | Ohtsu et al. | |
| 10,274,851 B2 | 4/2019 | Hashimoto et al. | |
| 10,353,312 B2 | 7/2019 | Kamae et al. | |
| 10,401,748 B2 | 9/2019 | Hashimoto et al. | |
| 10,423,086 B2 | 9/2019 | Hama et al. | |
| 10,423,090 B2 | 9/2019 | Ohtsu et al. | |
| 10,451,986 B2 | 10/2019 | Sano et al. | |
| 10,451,990 B2 | 10/2019 | Kamae et al. | |
| 10,474,049 B2 | 11/2019 | Onozaki et al. | |
| 10,514,624 B2 | 12/2019 | Tamura et al. | |
| 10,564,560 B2 | 2/2020 | Onozaki et al. | |
| 10,599,060 B2 | 3/2020 | Kanno et al. | |
| 10,642,178 B2 | 5/2020 | Yamashita et al. | |
| 10,656,545 B2 | 5/2020 | Kamae et al. | |
| 10,775,710 B1 | 9/2020 | Kamae et al. | |
| 2013/0108955 A1 | 5/2013 | Shibata et al. | |
| 2013/0244159 A1 | 9/2013 | Ishigami et al. | |
| 2013/0288173 A1 | 10/2013 | Hashimoto et al. | |
| 2014/0134535 A1 | 5/2014 | Baba et al. | |
| 2014/0137428 A1 | 5/2014 | Takenaka et al. | |
| 2014/0220487 A1 * | 8/2014 | Kamae | G03G 9/1131 430/111.35 |
| 2014/0329176 A1 | 11/2014 | Kanno et al. | |
| 2015/0099224 A1 * | 4/2015 | Abe | G03G 9/08773 430/110.2 |
| 2015/0099227 A1 | 4/2015 | Ida et al. | |
| 2016/0109820 A1 | 4/2016 | Hashimoto et al. | |
| 2016/0363889 A1 * | 12/2016 | Onozaki | G03G 9/1075 |
| 2017/0315463 A1 | 11/2017 | Onozaki et al. | |
| 2018/0246430 A1 * | 8/2018 | Tanaka | G03G 9/0827 |
| 2018/0275540 A1 | 9/2018 | Matsuo et al. | |
| 2018/0314176 A1 | 11/2018 | Ikeda et al. | |
| 2019/0384193 A1 | 12/2019 | Hashimoto et al. | |
| 2019/0384202 A1 | 12/2019 | Shirayama et al. | |
| 2020/0057397 A1 | 2/2020 | Murayama et al. | |
| 2020/0073263 A1 | 3/2020 | Hama et al. | |
| 2020/0073266 A1 | 3/2020 | Ohtsu et al. | |
| 2020/0272068 A1 | 8/2020 | Ochi et al. | |
| 2020/0301301 A1 | 9/2020 | Chimoto et al. | |

FOREIGN PATENT DOCUMENTS

| | | |
|---|---|---|
| JP | 2010244026 A | 10/2010 |
| JP | 2017097290 A | 6/2017 |

OTHER PUBLICATIONS

U.S. Appl. No. 17/116,402, Takeshi Hashimoto, filed Dec. 9, 2020.
U.S. Appl. No. 17/117,444, Ichiro Kanno, filed Dec. 10, 2020.
U.S. Appl. No. 17/117,883, Ichiro Kanno, filed Dec. 10, 2020.
U.S. Appl. No. 17/118,960, Masayuki Hama, filed Dec. 11, 2020.
U.S. Appl. No. 17/188,041, Takeshi Hashimoto, filed Mar. 1, 2021.

* cited by examiner

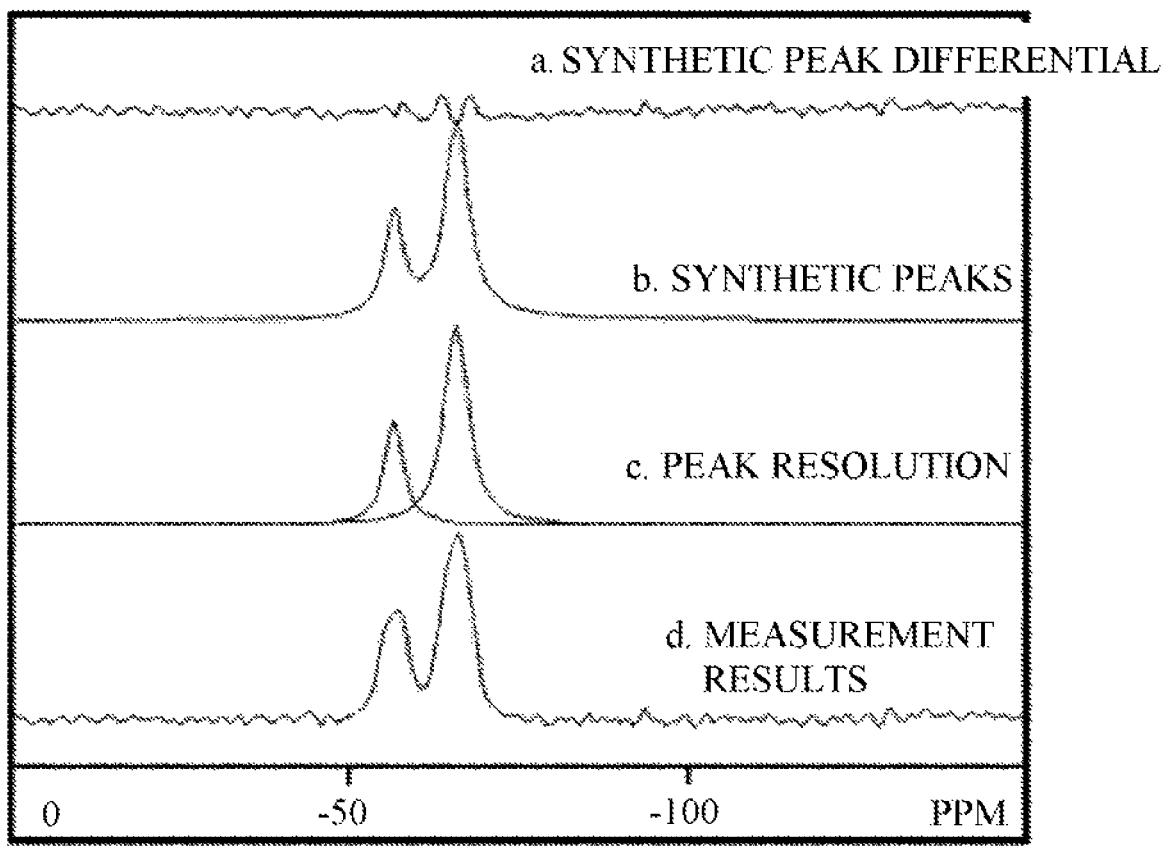

MAGNETIC CARRIER, TWO-COMPONENT DEVELOPER, AND METHOD FOR PRODUCING MAGNETIC CARRIER

BACKGROUND OF THE INVENTION

Field of the Invention

The present disclosure relates to the magnetic carrier and two-component developer that are used in, for example, electrophotographic systems, electrostatic recording systems, electrostatic printing systems, and so forth, and also relates to a method for producing a magnetic carrier.

Description of the Related Art

Accompanying the widespread dissemination in recent years of electrophotographic system-based full color copiers, there has naturally been demand for additional increases in speed and image quality, but there has also been demand for improvements in auxiliary capabilities, for example, with regard to maintenance costs, e.g., a maintenance-free capability. Within the realm of specific measures to support a maintenance-free capability, there is demand, in order to lower the frequency at which the developer must be replaced by service personnel, for a toner and magnetic carrier that are resistant to degradation even during long-term image output.

In this regard, Japanese Patent Application Laid-open No. 2010-244026 proposes a magnetic carrier that, even during long-term image output, is resistant to coating resin wear and is able to stably impart charge to toner; this is achieved by coating magnetic core particles with a resin having a prescribed structure.

In addition, Japanese Patent Application Laid-open No. 2017-097290 proposes a magnetic carrier that is resistant to the coating resin wear caused by magnetic carrier-to-magnetic carrier collisions and is able to stably impart charge to toner; this is achieved by the addition of filler particles to the coating layer on the magnetic carrier.

SUMMARY OF THE INVENTION

Each of the magnetic carriers described in the aforementioned documents does exhibit a certain effect with regard to inhibiting wear of the coating layer. However, accompanying the increases in copier speed, the load imposed on the magnetic carrier by, for example, the stirring screw in the developing device, has also assumed an increasing trend, and it has been found that as a consequence wear of the coating resin cannot be suppressed in the case of the magnetic carriers in the aforementioned documents, in which the majority of the coating layer is constituted of organic material. It has also been found that coating resin wear can cause: changes in the ability to impart charge to toner, the occurrence of leakage (charge is injected into the latent image through the magnetic carrier from the developer-carrying member and the potential of the electrostatic latent image bearing member assumes equipotentiality), and the occurrence of fluctuations in the image density.

In view of the preceding, there is a pressing need for the development of a magnetic carrier that, even during long-term image output, exhibits a suppression of wear of the coating layer on the magnetic carrier and thus exhibits an excellent ability to impart charge, an excellent inhibition of leakage, and an excellent image density stability.

The present disclosure provides a magnetic carrier that exhibits a suppression of wear of the coating layer on the magnetic carrier and that thus exhibits an excellent ability to impart charge, an excellent inhibition of leakage, and an excellent image density stability. The present disclosure also provides a two-component developer that contains this magnetic carrier and a method for producing this magnetic carrier.

The present disclosure relates to a magnetic carrier comprising a magnetic carrier particle, the magnetic carrier particle having a magnetic core particle and a coating layer of an organosilicon polymer on a surface of the magnetic core particle, wherein the organosilicon polymer has the structure given by the formula (T3) below;

$$R\text{—}Si(O_{1/2})_3 \tag{T3}$$

in the formula, R represents an alkyl group having from 1 to 6 carbons, a phenyl group, an amino group, or an alkylamino group having from 1 to 5 carbons, in $^{29}$Si-NMR measurement of the tetrahydrofuran-insoluble matter of the organosilicon polymer, the ratio ST3 of the peak area for the structure given by the formula (T3) to the total peak area for the organosilicon polymer is at least 0.05; and in the roughness curve measured on the magnetic carrier particle using a scanning probe microscope, the mean width (RSm) of the roughness curve elements of the magnetic carrier particle is from 20 nm to 500 nm and the ratio ($\sigma$/RSm), to this RSm, of the standard deviation $\sigma$ of the width of the region where one period of a protrusion and a recess occurs, is not more than 0.80.

The present disclosure also relates to a two-component developer comprising a toner and a magnetic carrier, wherein the toner includes a toner particle containing binder resin, and the magnetic carrier is the above magnetic carrier.

The present disclosure also relates to a method for producing the magnetic carrier according to claim 1, the magnetic carrier production method comprising:

a step of dispersing the magnetic core particles in an aqueous medium; and a step of coating the magnetic core particle surface with the organosilicon polymer.

The present disclosure can provide a magnetic carrier that exhibits a suppression of wear of the coating layer on the magnetic carrier and that thus exhibits an excellent ability to impart charge, an excellent inhibition of leakage, and an excellent image density stability. The present disclosure can also provide a two-component developer that contains this magnetic carrier and a method for producing this magnetic carrier.

Further features of the present invention will become apparent from the following description of exemplary embodiments with reference to the attached drawings.

BRIEF DESCRIPTION OF THE DRAWINGS

The FIGURE contains an example of curve fitting.

DESCRIPTION OF THE EMBODIMENTS

Unless otherwise specified, descriptions of numerical ranges such as "from XX to YY" or "XX to YY" include the numbers at the lower and upper limits of the range.

In the following, when numerical ranges are described in stages, the upper and lower limits of each numerical range can be combined arbitrarily.

The present disclosure relates to a magnetic carrier comprising a magnetic carrier particle, the magnetic carrier particle having a magnetic core particle and a coating layer of an organosilicon polymer on a surface of the magnetic core particle, wherein the organosilicon polymer has the structure given by the formula (T3) below;

$$R\text{—}Si(O_{1/2})_3 \qquad (T3)$$

in the formula, R represents an alkyl group having from 1 to 6 carbons, a phenyl group, an amino group, or an alkylamino group having from 1 to 5 carbons, in $^{29}$Si-NMR measurement of the tetrahydrofuran-insoluble matter of the organosilicon polymer, the ratio ST3 of the peak area for the structure given by the formula (T3) to the total peak area for the organosilicon polymer is at least 0.05; and in the roughness curve measured on the magnetic carrier particle using a scanning probe microscope, the mean width (RSm) of the roughness curve elements of the magnetic carrier particle is from 20 nm to 500 nm and the ratio (σ/RSm), to this RSm, of the standard deviation σ of the width of the region where one period of a protrusion and a recess occurs, is not more than 0.80.

The present inventors investigated the suppression of wear of the coating layer on magnetic carriers. In order to suppress coating layer wear, the present inventors carried out the addition to the coating layer of various types of filler particles with various particle diameters and also varied the configuration of the coating layer, e.g., using a multilayer, thick layer, and so forth, but this notwithstanding were unable to achieve a substantial solution to the problem. The cause of this is thought to reside in the majority of the coating layer being constituted of organic material.

The inventors therefore also carried out investigations into magnetic carriers that lacked a coating layer. However, a high surface resistance like that with a coating layer-bearing magnetic carrier was not provided by resistance-adjustment processes using the metal element ratio in the magnetic core particle or using the oxidation state as manipulated using a firing atmosphere, and magnetic carriers lacking a coating layer were unable to stably impart charge to toner. On the other hand, wear of the magnetic core particle itself was not seen.

The present inventors therefore considered the idea that a solution to the instant problem could be connected to the formation of a coating layer using a material that, while being a material derived from an organic material, could exhibit properties like those of an inorganic material. The present inventors also came up with the idea of coating the surface of the magnetic core particle with organosilicon polymer.

In $^{29}$Si-NMR measurement of the tetrahydrofuran (THF)-insoluble matter of the organosilicon polymer, the ratio ST3 of the peak area for the structure given by the preceding formula (T3) to the total peak area for the organosilicon polymer is at least 0.05. A value of at least 0.05 for ST3 means that a three-dimensional crosslinked structure is formed from the siloxane structure and wear resistance is then exhibited.

Due to this, even during long-term image output, wear of the coating layer on the magnetic carrier can be suppressed and an excellent ability to impart charge to toner is obtained.

In addition, because the surface free energy of the magnetic carrier surface can be lowered, toner spent to the magnetic carrier surface is suppressed and an excellent image density stability is obtained.

On the other hand, for example, a silicone resin coating layer corresponds to the relationship in which ST3 is less than 0.05. This means that a three-dimensional crosslinked structure is not formed and wear resistance is not exhibited. As a consequence, during long-term image output, wear of the coating layer of the magnetic carrier occurs and an excellent ability to impart charge to toner is not obtained.

ST3 can be controlled through the type and amount of the organosilicon compound(s) used to form the organosilicon polymer, and through the reaction temperature, reaction time, and pH in the hydrolysis and condensation polymerization during formation of the organosilicon polymer.

ST3 is preferably at least 0.40, more preferably at least 0.50, and still more preferably at least 0.60. The upper limit is not particularly limited, but is preferably not more than 0.85 and more preferably not more than 0.75.

In the roughness curve measured on the magnetic carrier particle using a scanning probe microscope, the mean width (RSm) of the roughness curve elements of the magnetic carrier particle is from 20 nm to 500 nm and the ratio (σ/RSm), to this RSm, of the standard deviation σ of the width of the region where one period of a protrusion and a recess occurs, is not more than 0.80.

An RSm in the indicated range means that fine protrusions and recesses are formed on the surface of the magnetic carrier. As a consequence, toner spent on the magnetic carrier surface is suppressed and an excellent image density stability is obtained.

A σ/RSm in the indicated range means that fine protrusions and recesses are continuously present on the surface of the magnetic carrier. As a consequence, toner spent is suppressed at all regions on the magnetic carrier surface and an excellent image density stability is obtained.

RSm and σ/RSm can be controlled through the type and amount of the organosilicon compound(s) used to form the organosilicon polymer, and through the reaction temperature, reaction time, and pH in the hydrolysis and condensation polymerization during formation of the organosilicon polymer, and through the type and amount of surfactant and dispersion stabilizer, which are described below.

RSm is preferably from 20 nm to 300 nm.

σ/RSm is preferably not more than 0.60. The lower limit on σ/RSm is not particularly limited, but is preferably at least 0.10 and more preferably at least 0.20.

The R in the structure given by formula (T3) represents an alkyl group having from 1 to 6 (preferably from 1 to 3, more preferably 1 or 2, and still more preferably 1) carbons, a phenyl group, an amino group, or an alkylamino group having from 1 to 5 (preferably from 1 to 3 and more preferably 1 or 2) carbons. There is little steric hindrance when R is the indicated functional group, and as a consequence the molecular density is controlled to be high and a strong three-dimensional crosslinked structure is formed. Wear resistance is exhibited due to this. As a result, even during long-term image output, wear of the coating layer on the magnetic carrier can be suppressed and an excellent ability to impart charge to toner is obtained.

In addition, the silicon atom is present to a suitable degree at the magnetic carrier surface and the surface free energy of the magnetic carrier surface can be lowered, and as a consequence toner spent on the magnetic carrier surface is suppressed and an excellent image density stability is obtained.

When, on the other hand, R is not the indicated functional group, this means that the molecular density becomes low and a strong three-dimensional crosslinked structure is not formed, and wear resistance is then not exhibited. As a consequence, in long-term image output, the coating layer on the magnetic carrier undergoes wear and an excellent ability to impart charge to toner is not obtained.

The use of a $C_{1-6}$ alkyl group or a phenyl group for R facilitates the occurrence of positive charging for charge application to the toner. The use of an amino group or a $C_{1-5}$ alkylamino group for R facilitates the occurrence of negative charging for charge application to the toner. R can be selected as appropriate in conformity with the charging performance desired for the toner.

The alkylamino group preferably has the following structure.

$$—(CH_2)_p—X—(CH_2)_q—NH_2$$

X represents a single bond or —NH—, and p and q each independently represent an integer from 0 to 5, wherein p+q is from 1 to 5 and preferably from 2 to 4.

The alkylamino group more preferably has the following structure.

$$—(CH_2)_p—NH_2$$

p represents an integer from 0 to 5 and preferably from 2 to 4.

In x-ray photoelectron spectroscopic analysis of the magnetic carrier, the ratio (dSi/[dSi+dO+dC]) in the surface layer of the magnetic carrier of the silicon atom concentration dSi to the sum (dSi+dO+dC) of the silicon atom concentration dSi, the oxygen atom concentration dO, and the carbon atom concentration dC, is preferably at least 2.5 atom % from the standpoint of achieving an excellent image density stability.

This ratio is more preferably at least 10.0 atom %, still more preferably at least 15.0 atom %, and even more preferably at least 20.0 atom %. The upper limit is not particularly limited, but is preferably not more than 40.0 atom % and more preferably not more than 30.0 atom %.

By having the silicon atom concentration be in the indicated range, the silicon atom is present to a suitable degree at the magnetic carrier surface and the surface free energy of the magnetic carrier surface can be lowered. As a consequence, toner spent on the magnetic carrier surface is suppressed and an excellent image density stability is obtained.

(dSi/[dSi+dO+dC]) can be controlled through the structure of R in formula (T3) and through the reaction temperature, reaction time, and pH in the hydrolysis and condensation polymerization during formation of the organosilicon polymer.

The ratio ST3/SX2 of ST3 to SX2 is preferably at least 1.0 from the standpoint of achieving an excellent charge stability, where, in $^{29}$Si-NMR measurement of the tetrahydrofuran-insoluble matter of the organosilicon polymer, SX2 is the ratio of the peak area for the structure for which the number of silicon-bonded $O_{1/2}$ is 2.0, to the total peak area for the organosilicon polymer.

ST3/SX2 is preferably at least 1.5 and is more preferably at least 2.0. The upper limit is not particularly limited, but is preferably not more than 3.5 and more preferably not more than 2.5.

Having the relationship ST3/SX2≥1.0 be satisfied means that a three-dimensional crosslinked structure having a siloxane structure is formed, and wear resistance is then exhibited. As a consequence, even during long-term image output, wear of the coating layer on the magnetic carrier is suppressed and an excellent ability to impart charge to toner is obtained.

ST3/SX2 can be controlled through the type and amount of the organosilicon compound(s) used to form the organosilicon polymer, and through the reaction temperature, reaction time, and pH in the hydrolysis and condensation polymerization during formation of the organosilicon polymer.

The magnetic carrier surface preferably has protrusions and recesses. From the standpoint of the image density stability, the arithmetic mean surface roughness Ra of the magnetic carrier surface preferably satisfies 10 nm≤Ra≤2000 nm and more preferably satisfies 10 nm≤Ra≤200 nm and still more preferably satisfies 50 nm≤Ra≤200 nm.

When Ra satisfies the indicated range, the area of contact between the toner and magnetic carrier is then small considering the curvature, and as a consequence the non-electrostatic attachment forces can be minimized. Due to this, toner spent on the magnetic carrier surface is suppressed and an excellent image density stability is obtained.

Ra can be controlled through the type and amount of the organosilicon compound(s) used to form the organosilicon polymer, through the reaction temperature, reaction time, and pH in the hydrolysis and condensation polymerization during formation of the organosilicon polymer, and through the type and amount of surfactant and dispersion stabilizer, which are described below.

From the standpoints of coating layer delamination, leakage suppression, and image stability, the magnetic carrier preferably has a primer layer comprising a vinyl polymer, and more preferably has a primer layer constituted of a vinyl polymer, between the magnetic core particle and the organosilicon polymer coating layer. The vinyl polymer preferably has the structure represented by the following formula (1).

($R_{V1}$ represents H, $CH_3$, or $C_2H_5$ (preferably H or $CH_3$), and $R_{V2}$ represents H or $CH_3$).

When a vinyl polymer represented by formula (1) is present as the primer layer, the adherence is increased due to the affinity between the ester moiety of the vinyl polymer and the silanol moiety of the organosilicon polymer. As a consequence, even during long-term image output, peeling by the coating layer is inhibited and the leakage inhibiting behavior and image stability are increased. In addition, by having $R_{V1}$ be H, $CH_3$, or $C_2H_5$, a suitable hydrophilicity is secured and the adherence due to the affinity with the silanol moiety of the organosilicon polymer is increased.

The content in the vinyl polymer of the structure with formula (1) is preferably 10 mass % to 60 mass % and is more preferably 20 mass % to 50 mass %.

The vinyl polymer preferably has a monomer unit derived from cycloalkyl (meth)acrylate. The number of carbons in the cycloalkyl group is preferably 4 to 10 and more preferably 5 to 8. The vinyl polymer more preferably has a monomer unit derived from cyclohexyl (meth)acrylate. The content of cycloalkyl (meth)acrylate-derived monomer unit in the vinyl polymer is preferably 40 mass % to 90 mass % and more preferably 50 mass % to 80 mass %.

From the standpoints of coating layer delamination, leakage suppression, and image stability, the content of the vinyl polymer in the primer layer is preferably 0.1 part by mass to 2.0 parts by mass per 100.0 parts by mass of the magnetic core particle. 0.5 parts by mass to 1.8 parts by mass is more preferred and 0.8 parts by mass to 1.7 parts by mass is still more preferred.

The adherence with the organosilicon polymer is increased by having the amount of vinyl polymer be in the indicated range. As a consequence, even during long-term image output, peeling by the coating layer is suppressed and leakage inhibition and image stability are increased.

In the execution of a degradation test in which 10000 prints of an image having a 1% image ratio are output using a process speed of 377 mm/sec and a two-component developer provided by mixing 92.0 parts of the magnetic carrier with 8.0 parts of a toner, the abraded amount of the organosilicon polymer that is the coating layer is preferably, from the standpoints of coating layer delamination, leakage suppression, and image stability, less than 2.0 mass % of the amount of the organosilicon polymer prior to the test. Less than 1.5 mass % is more preferred, less than 1.0 mass % is still more preferred, and less than 0.5 mass % is even more preferred. The lower limit is not particularly limited, but is preferably equal to or greater than 0.0 mass % and more preferably at least 0.05 mass %. Having this abraded amount be in the indicated range means that abrasion of the coating layer is suppressed and results in an increase in the leakage suppression and image stability.

The abraded amount of the coating layer can be controlled through the type and amount of the organosilicon compound (s) used to form the organosilicon polymer, through the reaction temperature, reaction time, and pH in the hydrolysis and condensation polymerization during formation of the organosilicon polymer, and through the type and amount of the vinyl polymer.

Method for Producing Magnetic Carrier

A generally known magnetic carrier can be used for the magnetic carrier here, and examples in this regard are metal particles such as those of iron, lithium, calcium, magnesium, nickel, copper, zinc, cobalt, manganese, and rare earths, as well as their alloy particles and oxide particles; magnetic bodies such as ferrite; and magnetic body-dispersed resin carriers, which contain a magnetic body and a binder resin that holds this magnetic body in a dispersed state. Known methods can be used without particular limitation as the method for producing the magnetic carrier.

The magnetic carrier production method preferably includes a step of dispersing magnetic core particles in an aqueous medium; and a step of coating the magnetic core particle surface with an organosilicon polymer.

From the standpoints of leakage suppression and image stability, the magnetic core particle is preferably a magnetic body-dispersed resin carrier core in which an irregularly shaped magnetic body is dispersed in a resin. A high resistance is maintained by having the magnetic core particle be a magnetic body-dispersed resin carrier core, and the suppression of leakage is facilitated as a result. By having the dispersed magnetic body particles have an irregular shape, the contact area with the toner is made small and the non-electrostatic attachment forces are minimized, and as a consequence toner spent on the magnetic carrier surface is suppressed and an excellent image density stability is obtained.

Method for Producing Magnetic Core Particle

A production procedure is described in the following using a magnetic body-dispersed resin carrier core as an example of the magnetic core particle.

A magnetic body-dispersed resin carrier core has magnetic bodies and a binder resin. The magnetic bodies preferably include magnetic particles A and magnetic particles B. Using magnetic particles A for magnetic particles having a number-average primary particle diameter of ra (μm) and using magnetic particles B for magnetic particles having a number-average primary particle diameter of rb (μm), ra (μm) and rb (μm) preferably reside in the relationship ra≥rb and more preferably ra>rb. An increase in the image stability is facilitated by having ra and rb satisfy the indicated relationship.

The magnetic particles can be exemplified by magnetite particles and maghemite particles.

In a preferred embodiment, magnetic particles A include magnetite particles and magnetic particles B include magnetite particles. Moreover, in the case of magnetic particles A, more preferably the magnetite particle surface is coated with the oxide of at least one nonferrous metal element selected from the group consisting of the element manganese, the element aluminum, the element magnesium, the element titanium, and the element nickel.

The magnetic particles B may also be coated with at least one nonferrous metal element selected from the group consisting of the element manganese, the element aluminum, the element magnesium, the element titanium, and the element nickel, but are more preferably magnetite particles not coated by these nonferrous metal elements.

The number-average primary particle diameter ra (μm) of the magnetic particles A is preferably from 0.30 μm to 3.00 μm and is more preferably from 0.60 μm to 2.80 μm.

The number-average primary particle diameter rb (μm) of the magnetic particles B is preferably from 0.10 μm to 2.50 μm and is more preferably from 0.15 μm to 1.50 μm.

The content in magnetic particles A of the at least one nonferrous metal element component selected from the group consisting of the element manganese, the element aluminum, the element magnesium, the element titanium, and the element nickel, is preferably from 20 mass % to 40 mass % and more preferably from 21 mass % to 35 mass %.

The content of the magnetic particles A in the magnetic particles used in the magnetic body-dispersed resin carrier core is preferably from 2.0 mass % to 20.0 mass %. The content of the magnetic particles B in the magnetic particles is preferably from 80.0 mass % to 98.0 mass %.

The following method is an example of the method for preparing magnetic particles A. Magnetite seed particles are produced; the resulting seed particle-containing slurry is then held in the temperature range from 70° C. to 95° C.; and the pH of the slurry is controlled to the range of 8.0 to 9.0.

Here, when the nonferrous metal element is the element aluminum, an aluminum salt is added at a rate of not more than 0.015 mass %/minute with respect to the seed particles. The magnetic particles A can thereafter be obtained by maturation for at least 30 minutes, pH adjustment, and then water washing and drying by ordinary methods.

When the nonferrous metal element is the element magnesium, the element manganese, the element nickel, or the element titanium, the pH of the seed particle-containing slurry is adjusted into the range of 9.5 to 10.5 in the case of the element magnesium, 8.0 to 9.0 in the case of the element manganese, 7.5 to 8.5 in the case of the element nickel, and 8.0 to 9.0 in the case of the element titanium. The particular metal salt is added at not more than 0.015 mass %/minute with respect to the seed particles, after which the magnetic particles A can be obtained by maturation for at least 30 minutes, pH adjustment, and then water washing and drying by ordinary methods.

The magnetic particles B, when coated, may be produced by the same method as described above for the magnetic particles A; however, when uncoated, the magnetite seed particles may be used as such.

These magnetic particles (magnetic inorganic compound particles) may be used in combination with nonmagnetic inorganic compound particles, e.g., nonmagnetic iron oxide particles such as hematite particles, nonmagnetic hydrated ferric oxide particles such as goethite particles, as well as titanium oxide particles, silica particles, talc particles, alumina particles, barium sulfate particles, barium carbonate particles, cadmium yellow particles, calcium carbonate particles, and zinc white particles.

With regard to the mixing proportions therebetween when magnetic inorganic compound particles are used in combination with nonmagnetic inorganic compound particles, the magnetic inorganic compound particles are preferably at least 30 mass % with reference to the total mass of both particles.

The magnetic inorganic compound particles are preferably treated, in whole or in part, with a lipophilizing treatment agent, and the nonmagnetic inorganic compound particles are preferably treated, in whole or in part, with a lipophilizing treatment agent.

The lipophilizing treatment agent can be exemplified by organic compounds that have at least one functional group selected from the group consisting of the epoxy group, amino group, mercapto group, organic acid group, ester group, ketone group, alkyl halide group, and aldehyde group, and by mixtures of such organic compounds.

A coupling agent is preferred for the functional group-bearing organic compound. Among coupling agents, silane coupling agents, titanium coupling agents, and aluminum coupling agents are more preferred. Silane-type coupling agents are even more preferred thereamong.

A thermosetting resin is preferred for the binder resin used in the magnetic body-dispersed resin carrier core.

The thermosetting resin can be exemplified by phenolic resins, epoxy resins, and polyester resins (for example, unsaturated polyester resins). Phenolic resins are preferred thereamong from the standpoint of ease of inexpensive production. Phenolic resins can be exemplified by phenol-formaldehyde resins.

The proportion for the binder resin constituting the magnetic body-dispersed resin carrier core is preferably from 1 mass % to 20 mass % with reference to the total mass of the magnetic body-dispersed resin carrier core. The proportion for the magnetic particles (magnetic inorganic compound particles) and optional nonmagnetic inorganic compound particles is preferably from 80 mass % to 99 mass % with reference to the total mass of the magnetic body-dispersed resin carrier core.

The magnetic body-dispersed resin carrier core can be produced, for example, by introducing a phenol or phenols and an aldehyde or aldehydes into an aqueous medium in the presence of a basic catalyst and magnetic particles A and B (and the optional nonmagnetic inorganic compound particles) and stirring. A reaction is then run between the phenol(s) and aldehyde(s) to bring about curing and produce the magnetic body-dispersed resin carrier core containing magnetic particles A and B and phenolic resin.

The magnetic body-dispersed resin carrier core can also be produced by, for example, a so-called kneading/pulverization method, in which resin containing magnetic particles A and B is pulverized. The former method is preferred from the standpoints of ease of control of the particle diameter of the magnetic carrier and providing a sharp particle size distribution for the magnetic carrier.

Organosilicon Compound

The method for producing the organosilicon polymer is not particularly limited, and known methods can be used. The method referred to as the sol-gel method is an example.

The sol-gel method is a method in which starting metal alkoxide $M(OR)_n$ (M: metal, O: oxygen, R: hydrocarbon, n: oxidation number of the metal) is subjected to hydrolysis and condensation polymerization in solvent to effect gelation while passing through a sol state. This method is used in methods for the synthesis of glasses, ceramics, organic-inorganic hybrids, and nanocomposites. This production method can be used to produce, at low temperatures from a liquid phase, functional materials in various shapes, e.g., surface layers, fibers, bulk articles, fine particles, and so forth.

In specific terms, the organosilicon polymer present in the surface layer of the magnetic core particle is preferably produced by the hydrolysis and condensation polymerization of an organosilicon compound as typified by alkoxysilanes.

By uniformly disposing a surface layer containing this organosilicon polymer on the magnetic core particle, a magnetic carrier can be obtained that has a wear resistance superior to that of conventional magnetic carriers.

Moreover, the sol-gel method starts from a solution and forms a material through the gelation of this solution, and as a consequence enables and supports the production of diverse microfine structures and shapes. In particular, when the magnetic core particles are dispersed in an aqueous medium and magnetic carrier production is then carried out in the aqueous medium, and when the organosilicon compound has a large hydrophobicity (for example, in the case of a hydrocarbon group for which the number of carbons in the hydrocarbon group in the organosilicon compound exceeds 6), the organosilicon polymer in the process of condensation polymerization readily becomes unstable in the early phase of the condensation polymerization. As a consequence, precipitation on the magnetic core particle surface tends to readily occur in the early phase. The unevenness in the magnetic carrier surface tends to decrease as a result.

On the other hand, hydrophilicity is provided when the number of carbons in the hydrocarbon group in the organosilicon compound is 0, and as a consequence the development of the condensation polymerization is facilitated and there is a tendency for precipitation onto the magnetic core particle surface after the formation of large particles to be facilitated. The unevenness in the magnetic carrier surface tends to increase as a result. The shape can also be adjusted using, for example, the reaction temperature, reaction time, reaction solvent, and pH and the type and amount of the organosilicon compound(s).

The organosilicon polymer preferably is a condensation polymer of an organosilicon compound having the structure given by the following formula (Z).

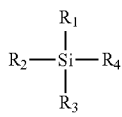

(Z)

($R_1$ represents an alkyl group having from 1 to 6 carbons, a phenyl group, an amino group, or an alkylamino group having from 1 to 5 carbons, and $R_2$, $R_3$, and $R_4$ each independently represent a halogen atom, hydroxy group, acetoxy group, or alkoxy group.) $R_1$ is the same as the R in the structure given by the formula (T3).

The hydrophobicity can be increased by the alkyl group, phenyl group, or alkylamino group for $R_1$ and a magnetic carrier having an excellent environmental stability can be obtained. An alkyl group having from 1 to 6 carbons or a phenyl group is preferred for $R_1$. When $R_1$ is an alkyl group having from 1 to 6 carbons or a phenyl group, there is little steric hindrance during condensation polymerization of the organosilicon compound and as a result the molecular density is controlled to be high and a strong three-dimensional crosslinked structure is formed and wear resistance is exhibited as a consequence.

Due to this, even during long-term image output, wear of the coating layer on the magnetic carrier can be suppressed and an excellent ability to impart charge to toner is obtained. In addition, the silicon atom is present to a suitable degree at the magnetic carrier surface and the surface free energy of the magnetic carrier surface can be lowered, and as a consequence toner spent on the magnetic carrier surface is suppressed and an excellent image density stability is obtained.

The use of a $C_{1-6}$ alkyl group or a phenyl group for $R_1$ facilitates the occurrence of positive charging for charge application to the toner. The use of an amino group or a $C_{1-5}$ alkylamino group for $R_1$ facilitates the occurrence of negative charging for charge application to the toner. An appropriate selection can be made in conformity with the charging performance desired for the toner.

$R_2$, $R_3$, and $R_4$ are each independently a halogen atom, hydroxy group, acetoxy group, or alkoxy group (also referred to herebelow as reactive groups). These reactive groups undergo hydrolysis, addition polymerization, and condensation polymerization, thereby forming a crosslinked structure and thus making it possible to obtain a magnetic carrier that exhibits an excellent wear resistance.

From the standpoints of hydrolysis being gentle at room temperature and the precipitation behavior onto, and coatability of, the surface of the magnetic core particle, $R_2$, $R_3$, and $R_4$ are preferably alkoxy groups with the methoxy group and ethoxy group being more preferred. The hydrolysis, addition polymerization, and condensation polymerization of $R_2$, $R_3$, and $R_4$ can be controlled through the reaction temperature, reaction time, reaction solvent, and pH.

A single species or a combination of a plurality of species of the organosilicon compound (also referred to as a trifunctional silane in the following) having, in the formula (Z) given above, three reactive groups ($R_2$, $R_3$, and $R_4$) in the single molecule excluding $R_1$, may be used to obtain the organosilicon polymer.

The content of the organosilicon polymer in the magnetic carrier is preferably from 0.10 mass % to 20.00 mass % and is more preferably from 0.25 mass % to 10.00 mass %.

The following are examples of the compound represented by formula (Z) above: trifunctional methyl silanes such as methyl trimethoxysilane, methyl triethoxysilane, methyl diethoxymethoxysilane, methyl ethoxydimethoxysilane, methyl trichlorosilane, methyl methoxydichlorosilane, methyl ethoxydichlorosilane, methyl dimethoxychlorosilane, methyl methoxyethoxychlorosilane, methyl diethoxychlorosilane, methyl triacetoxysilane, methyl diacetoxymethoxysilane, methyl diacetoxyethoxysilane, methyl acetoxydimethoxysilane, methyl acetoxymethoxyethoxysilane, methyl acetoxydiethoxysilane, methyl trihydroxysilane, methyl methoxydihydroxysilane, methyl ethoxydihydroxysilane, methyl dimethoxyhydroxysilane, methyl ethoxymethoxyhydroxysilane, and methyl diethoxyhydroxysilane; and trifunctional silanes such as ethyl trimethoxysilane, ethyl triethoxysilane, ethyl trichlorosilane, ethyl triacetoxysilane, ethyl trihydroxysilane, propyl trimethoxysilane, propyl triethoxysilane, propyl trichlorosilane, propyl triacetoxysilane, propyl trihydroxysilane, butyl trimethoxysilane, butyl triethoxysilane, butyl trichlorosilane, butyl triacetoxysilane, butyl trihydroxysilane, hexyltrimethoxysilane, hexyltriethoxysilane, hexyltrichlorosilane, hexyltriacetoxysilane and hexyltrihydroxysilane.

Trifunctional phenylsilanes such as phenyltrimethoxysilane, phenyltriethoxysilane, phenyltrichlorosilane, phenyltriacetoxysilane, and phenyltrihydroxysilane.

Trifunctional aminosilanes such as 3-aminopropyltrimethoxysilane, 3-aminopropyltriethoxysilane, 3-(2-aminoethyl)aminopropyltrimethoxysilane, 3-(2-aminoethyl)aminopropyltriethoxysilane, and 3-phenylaminopropyltrimethoxysilane.

The content of the structure given by formula (Z) in the monomer that forms the organosilicon polymer is preferably at least 50 mol % and more preferably at least 60 mol %. Having this content be at least 50 mol % makes it possible to secure additional improvements in the wear resistance of the magnetic carrier.

To the extent that the effects of the present invention are not impaired, the following may be used in combination with the organosilicon compound(s) having the structure given by the formula (Z): an organosilicon compound having four reactive groups in each molecule (tetrafunctional silane), an organosilicon compound having two reactive groups in each molecule (difunctional silane), or an organosilicon compound having one reactive group (monofunctional silane). Examples thereof are as follows:

dimethyldiethoxysilane, tetraethoxysilane, hexamethyldisilazane, 3-glycidoxypropyltrimethoxysilane, 3-glycidoxypropylmethyldiethoxysilane, 3-glycidoxypropyltriethoxysilane, p-styryltrimethoxysilane, 3-methacryloxypropylmethyldimethoxysilane, 3-methacryloxypropylmethyldiethoxysilane, 3-methacryloxypropyltriethoxysilane, 3-acryloxypropyltrimethoxysilane, 3-anilinopropyltrimethoxysilane, 3-mercaptopropylmethyldimethoxysilane, 3-mercaptopropyltrimethoxysilane, 3-mercaptopropyltriethoxysilane, 3-glycidoxypropyltrimethoxysilane, 3-glycidoxypropylmethyldimethoxysilane, 3-glycidoxypropylmethyldiethoxysilane, hexamethyldisilane, tetraisocyanatosilane, and methyltriisocyanatosilane; trifunctional vinylsilanes such as vinyltriisocyanatosilane, vinyltrimethoxysilane, vinyltriethoxysilane, vinyldiethoxymethoxysilane, vinylethoxydimethoxysilane, vinyltrichlorosilane, vinylmethoxydichlorosilane, vinylethoxydichlorosilane, vinyldimethoxychlorosilane, vinylmethoxyethoxychlorosilane, vinyldiethoxychlorosilane, vinyltriacetoxysilane, vinyldiacetoxymethoxysilane, vinyldiacetoxyethoxysilane, vinylacetoxydimethoxysilane, vinylacetoxymethoxyethoxysilane, vinylacetoxydiethoxysilane, vinyltrihydroxysilane, vinylmethoxydihydroxysilane, vinylethoxydihydroxysilane, vinyldimethoxyhydroxysilane, vinylethoxymethoxyhydroxysilane, and vinyldiethoxyhydroxysilane;

trifunctional allylsilanes such as allyltrimethoxysilane, allyltriethoxysilane, allyltrichlorosilane, allyltriacetoxysilane, and allyltrihydroxysilane; and t-butyldimethylchlorosilane, t-butyldimethylmethoxysilane, t-butyldimethylethoxysilane, t-butyldiphenylchlorosilane, t-butyldiphenylmethoxysilane, t-butyldiphenylethoxysilane, chloro(decyl)dimethylsilane, methoxy(decyl)dimethylsilane, ethoxy(decyl)dimethylsilane, chlorodimethylphenylsilane, methoxydimethylphenylsilane, ethoxydimethylphenylsilane, chlorotrimethylsilane, methoxytrimethylsilane, ethoxytrimethylsilane, triphenylchlorosilane, triphenylmethoxysilane, triphenylethoxysilane, chloromethyl(dichloro)methylsilane, chloromethyl(dimethoxy)methylsilane, chloromethyl(diethoxy)methylsilane, di-tert-butyldichlorosilane, di-tert-butyldimethoxysilane, di-tert-butyldiethoxysilane, dibutyldichlorosilane, dibutyldimethoxysilane, dibutyldiethoxysilane, dichlorodecylmethylsilane, dimethoxydecylmethylsilane, diethoxydecylmethylsilane, dichlorodimethylsilane, dimethoxydimethylsilane, diethoxydimethylsilane, dichloro(methyl)-n-octylsilane, dimethoxy(methyl)-n-octylsilane, and diethoxy(methyl)-n-octylsilane.

Step of Dispersing Magnetic Core Particles in Aqueous Medium

A sparingly water-soluble inorganic dispersion stabilizer may be used when the magnetic core particles are dispersed in the aqueous medium. The amount of addition of the sparingly water-soluble inorganic dispersion stabilizer is preferably from 0.2 parts by mass to 2.0 parts by mass per 100.0 parts by mass of the magnetic core particles.

In addition, the magnetic core particle dispersion medium is preferably prepared using from 300 parts by mass to 3,000 parts by mass of water per 100 parts by mass of the magnetic core particles.

A commercial dispersion stabilizer may be used as such in the preparation of the aqueous medium in which the sparingly water-soluble inorganic dispersing agent is dispersed. In addition, in order to obtain a dispersion stabilizer having a fine and uniform particle size, the sparingly water-soluble inorganic dispersing agent may be produced in a liquid medium, such as water, while applying high-speed stirring.

Specifically, in the case of the use of tricalcium phosphate as the dispersion stabilizer, a preferred dispersion stabilizer can be obtained by forming fine tricalcium phosphate particles by mixing an aqueous solution of sodium phosphate with an aqueous solution of calcium chloride while applying high-speed stirring. Moreover, the use of a tricalcium phosphate dispersion stabilizer is preferred from the standpoints of delamination of the coating layer of the organosilicon polymer, leakage suppression, and image stability. The reason for this resides in the crystalline structure of tricalcium phosphate.

Tricalcium phosphate is composed of an assembly of hexagonal crystal structures in which phosphate ions are arrayed on the circumference of a central calcium ion. As a consequence, at the magnetic carrier surface the calcium ion readily becomes oriented to the aqueous medium; the electrical attractive force with the silanol group, which is a moiety provided by hydrolysis of the organosilicon compound(s) in the aqueous medium, increases; and formation of the coating layer of organosilicon polymer is facilitated.

Addition of Surfactant

From the standpoints of delamination of the coating layer, leakage suppression, and image stability, preferably a compound A is added in the step of dispersing the magnetic core particles in the aqueous medium and this compound A is represented by at least one selection from the group consisting of formulas (1-1), (1-2), (2-1) to (2-5), and (3-1) to (3-5).

The presence of the compound A serves to increase the adherence due to the affinity between the hydrophilic group in compound (A) and the silanol moiety in the organosilicon polymer. As a result, even during long-term image output, peeling of the coating layer and leakage are suppressed and the image stability is increased.

The attachment of compound A to the magnetic core particle surface through the addition of compound A in the magnetic core particle dispersion step is preferred from the standpoints of suppression of delamination of the organosilicon polymer coating layer as well as leakage suppression and image stability. Among the preceding, compound A is more preferably represented by at least one selection from the group consisting of formulas (3-1) to (3-5).

Compound A has a $C_{3-30}$ hydrocarbon group segment, which exhibits hydrophobicity, and a hydrophilic segment with a polarity higher than that of the hydrocarbon group. As a consequence, the hydrophobic group tends to readily orient to the magnetic core particle and the hydrophilic group tends to readily orient to the organosilicon polymer and the adherence between the magnetic core particle and organosilicon polymer is increased.

The compound group represented by formulas (1-1) and (1-2) has the following features in common: the $C_{3-30}$ hydrocarbon group represented by R' exhibits hydrophobicity, and the positive charge-bearing nitrogen atom has a high polarity, resulting in the appearance of hydrophilicity. The compound represented by formula (1-1) can be exemplified by the quaternary ammonium salt compounds given below.

(1-1)

(In formula (1-1), R' represents a hydrocarbon group having 3 to 30 carbons and $R_{C1}$ to $R_{C3}$ each independently represent a hydrogen atom or an alkyl group having 1 to 30 carbons (which may contain one or more ether bonds, and the same one may be contained). X is one element selected from Cl, Br, and I.)

Examples of R' are $C_{3-30}$ straight-chain alkyl groups, $C_{3-30}$ branched alkyl groups, $C_{3-30}$ straight-chain alkenyl groups, $C_{3-30}$ branched alkenyl groups, and the benzyl group.

Examples of specific compounds are the following, in which X=Cl: alkyltrimethylammonium chlorides, e.g., tetrabutylammonium chloride, octyltrimethylammonium chloride, decyltrimethylammonium chloride, dodecyltrimethylammonium chloride, tetradecyltrimethylammonium chloride, cetyltrimethylammonium chloride, stearyltrimethylammonium chloride, and behenyltrimethylammonium chloride; ammonium chlorides that contain the benzyl group, e.g., benzyltrimethylammonium chloride, benzyltriethylammonium chloride, benzalkonium chloride, and benzethonium chloride; and dialkyldimethylammonium chlorides such as didecyldimethylammonium chloride and distearyldimethylammonium chloride.

Additional examples are the bromides, in which X is Br in the preceding compounds, and the iodides, in which X is I in the preceding compounds.

Additional examples are the hydrochlorides of alkylamines, e.g., cocoamine acetate and stearylamine acetate.

The following are preferred among the preceding: octyltrimethylammonium chloride, decyltrimethylammonium chloride, dodecyltrimethylammonium chloride, tetradecyltrimethylammonium chloride, cetyltrimethylammonium chloride, stearyltrimethylammonium chloride, and distearyldimethylammonium chloride, in which R' is a $C_{8-18}$ hydrocarbon group; benzyltrimethylammonium chloride; and cocoamine acetate and stearylamine acetate.

Compounds with formula (1-2) can be exemplified by the pyridinium salts given below.

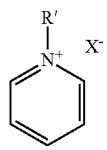

(1-2)

(In formula (1-2), R' is a $C_{3-30}$ hydrocarbon group and X is one element selected from Cl, Br, and I.)

Examples of R' are $C_{3-30}$ straight-chain alkyl groups, $C_{3-30}$ branched alkyl groups, $C_{3-30}$ straight-chain alkenyl groups, $C_{3-30}$ branched alkenyl groups, and the benzyl group. $C_{8-18}$ alkyl groups or alkenyl groups are preferred.

Examples of specific compounds are alkylpyridinium chlorides such as butylpyridinium chloride, dodecylpyridinium chloride, and cetylpyridinium chloride.

Compound A is also exemplified by the compound group represented by formulas (2-1) to (2-5).

The compound group represented by formulas (2-1) to (2-5) has the following feature in common: the $C_{3-30}$ hydrocarbon group represented by R' exhibits hydrophobicity. In addition, a segment is present that derives from at least one selection from the group consisting of carboxylic acid, sulfonic acid, and phosphoric acid, and this segment exhibits hydrophilicity due to its high polarity.

For example, compounds represented by formula (2-1) are as follows.

$$R'\text{-}A\text{-}B\text{—}X \quad (2\text{-}1)$$

(In formula (2-1), R' is a hydrocarbon group having 3 to 30 carbons and X is $CO_2M^1$ or $SO_3M^1$ ($M^1$ is a hydrogen atom, sodium, potassium, lithium, ammonium, or triethanolamine). A is a single bond, —O— (ether bond), or >C=O (carbonyl). B is a single bond or —$(CH_2CH_2O)_n$— or —$(CH_2CH_2O)_n$—$CH_2$—, and n is an integer from 1 to 60.)

Examples of R' are $C_{3-30}$ straight-chain alkyl groups, $C_{3-30}$ branched alkyl groups, $C_{3-30}$ straight-chain alkenyl groups, $C_{3-30}$ branched alkenyl groups, the benzyl group, the phenyl group or naphthyl group, and a phenyl group or naphthyl group having a straight-chain or branched alkyl group bonded to the benzene ring. Among the preceding, a hydrocarbon group having 8 to 30 carbons readily exhibits hydrophobicity and is thus particularly preferred.

Examples of specific compounds in which A and B are a single bond are as follows: higher fatty acids, e.g., lauric acid, stearic acid, oleic acid, and palmitic acid, and their sodium salts, potassium salts, and lithium salts; the sodium salts, potassium salts, and triethanolamine salts of alkanesulfonic acids, e.g., octanesulfonic acid, decanesulfonic acid, dodecanesulfonic acid, tetradecanesulfonic acid, hexadecanesulfonic acid, and octadecanesulfonic acid, and α-olefinsulfonic acids; alkylbenzenesulfonic acids, e.g., toluenesulfonic acid, cumenesulfonic acid, octylbenzenesulfonic acid, and dodecylbenzenesulfonic acid, and their sodium salts, potassium salts, and triethanolamine salts; and the sodium salts, potassium salts, and triethanolamine salts of naphthalenesulfonic acid and alkylnaphthalenesulfonic acids.

Examples of compounds in which A is an ether bond (—O—) and B is a single bond are as follows: alkyl sulfate salts such as sodium lauryl sulfate, sodium myristyl sulfate, ammonium lauryl sulfate, triethanolamine lauryl sulfate, sodium cetyl sulfate, and sodium stearyl sulfate.

Examples of compounds in which B is —$(CH_2CH_2O)_n$— are as follows: sodium, triethanolamine polyoxyethylene lauryl ether sulfate, ammonium polyoxyethylene lauryl ether sulfate, and sodium polyoxyethylene alkyl ether sulfates such as sodium polyoxyethylene stearyl ether sulfate.

Compounds in which B is —$(CH_2CH_2O)_n$—$CH_2$— can be exemplified by polyoxyethylene alkyl ether carboxylate salts such as sodium polyoxyethylene lauryl ether acetate and polyoxyethylene stearyl ether acetate.

Preferred among the preceding are fatty acid salts, e.g., sodium laurate and sodium stearate, sulfonates such as sodium dodecanesulfonate and sodium octadecanesulfonate, and alkyl sulfate salts such as sodium lauryl sulfate and sodium stearyl sulfate, in which the number of carbons in R' is 8 to 18.

More preferred are polyoxyethylene alkyl ether sulfate salts and polyoxyethylene alkyl ether carboxylate salts, which have 8 to 18 carbons in R' and have the $(CH_2CH_2O)_n$ structure in the compound. The $(CH_2CH_2O)_n$ structure exhibits a high affinity with the organosilicon polymer and provides an enhanced adhesiveness and is thus preferred.

Compounds represented by formula (2-2) are as follows.

(2-2)

(R' is a hydrocarbon group having 3 to 30 carbons; $R_{C4}$ is hydrogen, a methyl group, or an ethyl group; Y is hydrogen, a methyl group, a carboxy group, a carboxymethyl group, or a carboxyethyl group; and $M^2$ is sodium, potassium, or triethanolamine.)

Specific examples are the salts of N-acylamino acid derivatives, e.g., sodium N-lauroylsarcosinate, sodium cocoylglutamate, N-lauroylglutamate salts (e.g., sodium lauroylglutamate), N-lauroylmethyl-β-alanate salts, N-acylglycinate salts, and N-acylglutamate salts.

Preferred among the preceding are N-lauroylglutamate salts, N-lauroylglycinate salts, and N-lauroylalanate salts, in which the number of carbons in R' is 8 to 18.

Compounds represented by formula (2-3) are as follows.

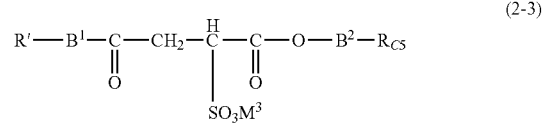

(2-3)

(R' is a hydrocarbon group having 3 to 30 carbons; $R_{C5}$ is hydrogen or a hydrocarbon group having 1 to 30 carbons; R' and $R_{C5}$ may be the same as each other or may differ from one another; $B^1$ and $B^2$ are each independently a single bond, —(CH$_2$CH$_2$O)$_n$—, or —(CH$_2$)$_m$—; and $M^3$ is sodium or potassium. n is an integer from 1 to 60.)

Specific examples are the sodium salts and potassium salts of alkyl sulfosuccinates, e.g., sodium octyl sulfosuccinate, sodium dioctyl sulfosuccinate, sodium lauryl sulfosuccinate, and sodium dilauryl sulfosuccinate; the sodium salts and potassium salts of the alkyl ethers of polyoxyethylene sulfosuccinate; and the sodium salts and potassium salts of polyoxyethylene alkyl sulfosuccinates.

Preferred among the preceding are alkyl sulfosuccinate salts in which the number of carbons in R' is 8 to 18.

More preferred are the sodium salts and potassium salts of the alkyl ethers of polyoxyethylene sulfosuccinic acids having 8 to 18 carbons in R' and having the (CH$_2$CH$_2$O)$_n$ structure in the compound. The (CH$_2$CH$_2$O)$_n$ structure exhibits a high affinity with the organosilicon polymer and provides an enhanced adhesiveness and is thus preferred.

Compounds represented by formulas (2-4) and (2-5) are as follows.

(2-4)

(2-5)

(R' is a hydrocarbon group having 3 to 30 carbons; $R_{C6}$ is hydrogen or a hydrocarbon group having 1 to 30 carbons; R' and $R_{C6}$ may be the same as each other or may differ from one another; $B^3$, $B^4$, and $B^5$ are each independently a single bond, —(CH$_2$CH$_2$O)$_n$—, or —(CH$_2$CH$_2$O)$_n$—CH$_2$—; and $M^4$ and $M^5$ are each independently sodium or potassium. n is an integer from 1 to 60.)

Examples of specific compounds are alkyl phosphate salts such as sodium lauryl phosphate, sodium dilauryl phosphate, potassium lauryl phosphate, and potassium dilauryl phosphate; polyoxyethylene alkyl ether phosphate salts such as sodium polyoxyethylene lauryl ether phosphate; polyoxyethylene alkylphenyl ether phosphate salts such as sodium polyoxyethylene laurylphenyl ether phosphate; and polyoxyethylene styrenated phenyl phosphate esters such as sodium polyoxyethylene styrenated phenyl ether lauryl phosphate.

Preferred among the preceding are alkyl phosphate salts in which the number of carbons in R' is 8 to 18.

More preferred are polyoxyethylene alkyl ether phosphate salts, polyoxyethylene alkylphenyl ether phosphate salts, and polyoxyethylene styrenated phenyl phosphate esters, in each case having 8 to 18 carbons in R' and having the (CH$_2$CH$_2$O)$_n$ structure in the compound. The (CH$_2$CH$_2$O)$_n$ structure exhibits a high affinity with the organosilicon polymer and provides an enhanced adhesiveness and is thus preferred.

Compound A is exemplified by the compound group represented by formulas (3-1) to (3-5).

The compound group represented by formulas (3-1) to (3-5) has the following feature in common: the $C_{3-30}$ hydrocarbon group represented by R' exhibits hydrophobicity. By having within the compound a plurality of oxyethylenes and/or analogous structures thereto, as typified by the structure represented by (CH$_2$CH$_2$O)$_n$, the structure of this compound exhibits hydrophilicity. The (CH$_2$CH$_2$O)$_n$ structure exhibits a high affinity with the organosilicon polymer and provides an enhanced adhesiveness and is thus preferred.

Compounds represented by formula (3-1) are as follows.

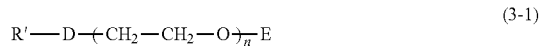

(3-1)

(R' is a hydrocarbon group having 3 to 30 carbons. D is a single bond, ether bond (—O—), ester bond (—COO—), amide group (—CONR$_{C7}$—), or amino group (—NR$_{C7}$—) ($R_{C7}$ is a hydrogen atom or an alkyl group having 1 to 30 carbons). E is a hydrogen atom or an acyl group having 2 to 31 carbons, and n is an integer from 1 to 60.)

Examples of specific compounds are as follows: polyoxyethylene alkyl ethers and polyoxyethylene alkenyl ethers, e.g., pentaethylene glycol dodecyl ether, octaethylene glycol dodecyl ether, polyoxyethylene lauryl ether, polyoxyethylene monocetyl ether, and polyoxyethylene stearyl ether; polyoxyethylene alkylphenyl ethers, e.g., octylphenol ethoxylate and nonylphenol ethoxylate; polyoxyethylene tribenzylphenyl ether and polyoxyethylene styrenated phenyl ether; polyoxyethylene fatty acid esters, e.g., polyoxyethylene laurate ester, polyoxyethylene cetylate ester, and polyoxyethylene stearate ester; polyoxyethylene alkylamines, e.g., polyoxyethylene laurylamine, polyoxyethylene cetylamine, and polyoxyethylene stearylamine; fatty acid diesters of ethylene glycol, e.g., ethylene glycol distearate, ethylene glycol dilaurate, ethylene glycol dioleate, ethylene glycol dipalmitate, and ethylene glycol dimyristate; and polyoxyethylene fatty acid diesters, e.g., polyethylene glycol dilaurate, polyethylene glycol distearate, polyethylene glycol dipalmitate, and polyethylene glycol dioleate.

Among the preceding, polyoxyethylene alkyl ethers, polyoxyethylene alkenyl ethers, polyoxyethylene alkylphenyl ethers, polyoxyethylene tribenzylphenyl ether, polyoxyethylene styrenated phenyl ether, polyoxyethylene fatty acid esters, polyoxyethylene alkylamines, fatty acid diesters of ethylene glycol, and polyoxyethylene fatty acid diesters, in which the number of carbons in R' is 8 to 18, are preferred.

In addition, when the resin constituting the core particle has a benzene ring-containing structure, the adherence of the organosilicon polymer with the core particle is further improved when a benzene ring is present in the compound, as in, for example, polyoxyethylene alkylphenyl ethers, polyoxyethylene tribenzylphenyl ether, and polyoxyethylene styrenated phenyl ethers, and this is thus preferred.

Compounds represented by formula (3-2) are as follows.

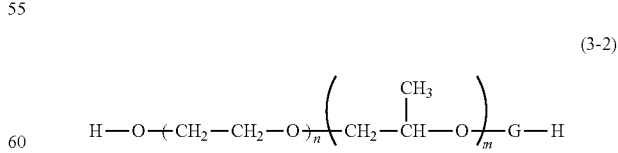

(3-2)

(G is a single bond or —(CH$_2$—CH$_2$—O)$_q$—, and m, n, and q are each independently an integer from 1 to 60.)

Examples of specific compounds are polyoxyethylene polyoxypropylene polyol and polyoxyethylene polyoxypropylene glycol.

Compounds represented by formula (3-3) are as follows.

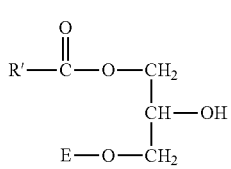

(3-3)

(R' is a hydrocarbon group having 3 to 30 carbons, and E is a hydrogen atom or an acyl group having 2 to 31 carbons.)

Examples of specific compounds are the fatty acid monoesters of glycerol, e.g., glycerol monostearate and glycerol monooleate, and the fatty acid diesters of glycerol, e.g., glycerol distearate and glycerol dioleate.

Preferred among the preceding are fatty acid esters of glycerol in which the number of carbons in R' is 8 to 18.

Compounds represented by formula (3-4) are as follows.

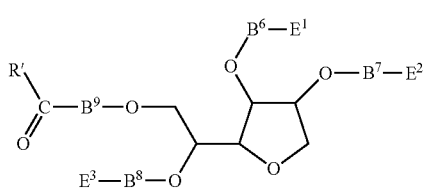

(3-4)

(R' is a hydrocarbon group having 3 to 30 carbons. $B^6$, $B^7$, $B^8$, and $B^9$ are each independently a single bond, $-(CH_2CH_2O)_n-$, or $-(CH_2CH_2O)_n-CH_2-$. $E^1$, $E^2$, and $E^3$ are each independently a hydrogen atom or an acyl group having 2 to 31 carbons. n is an integer from 1 to 60.)

Examples of specific compounds are fatty acid monoesters of sorbitan, e.g., sorbitan monolaurate, sorbitan monooleate, sorbitan monopalmitate, and sorbitan monostearate; fatty acid diesters of sorbitan, e.g., sorbitan dilaurate, sorbitan dioleate, sorbitan dipalmitate, and sorbitan distearate; fatty acid triesters of sorbitan, e.g., sorbitan trilaurate, sorbitan trioleate, sorbitan tripalmitate, and sorbitan tristearate, or monoester/diester mixtures, e.g., sorbitan sesquioleate; fatty acid monoesters of polyoxyethylene sorbitan, e.g., polyoxyethylene sorbitan monolaurate, polyoxyethylene sorbitan monopalmitate, polyoxyethylene sorbitan monostearate, polyoxyethylene sorbitan monooleate, and polyoxyethylene sorbitan monoisostearate; fatty acid diesters of polyoxyethylene sorbitan, e.g., polyoxyethylene sorbitan dilaurate, polyoxyethylene sorbitan dipalmitate, polyoxyethylene distearate, polyoxyethylene sorbitan dioleate, and polyoxyethylene sorbitan diisostearate; and fatty acid triesters of polyoxyethylene sorbitan, e.g., polyoxyethylene sorbitan trilaurate, polyoxyethylene sorbitan tripalmitate, polyoxyethylene sorbitan tristearate, polyoxyethylene sorbitan trioleate, and polyoxyethylene sorbitan triisostearate.

Preferred among the preceding are fatty acid esters of sorbitan in which the number of carbons in R' is 8 to 18. More preferred are fatty acid esters of a polyoxyethylene sorbitan in which a portion of the hydroxyl groups in the sorbitan are polyoxyethylated. The $(CH_2CH_2O)_n$ structure exhibits a high affinity with the organosilicon polymer and provides an enhanced adhesiveness and is thus preferred.

Compounds represented by formula (3-5) are as follows.

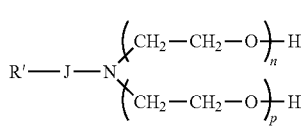

(3-5)

(R' is a hydrocarbon group having 3 to 30 carbons. J is a single bond or a carbonyl bond (>C=O). n is an integer from 1 to 60, and p is an integer from 0 to 60.)

Examples of specific compounds are as follows: fatty acid alkylolamides and polyoxyethylene fatty acid amides, e.g., the diethanolamide of lauric acid, diethanolamide of stearic acid, diethanolamide of oleic acid, and diethanolamide of palmitic acid; and polyoxyethylene alkylamines, e.g., polyoxyethylene laurylamine, polyoxyethylene stearylamine, and polyoxyethylene oleylamine.

Preferred among the preceding are fatty acid alkylolamides and alkylamines for which the number of carbons in R' is 8 to 18.

More preferred are polyoxyethylene fatty acid amides and polyoxyethylene alkylamines that have the $(CH_2CH_2O)$ structure in the compound. The $(CH_2CH_2O)_n$ structure exhibits a high affinity with the organosilicon polymer and provides an enhanced adhesiveness and is thus preferred.

A single one of these compounds A may be used by itself or a plurality may be used in combination. When a plurality is used in combination, for example, a combination from the compound group given by formula (1-1) may be used, or a combination may be used of one or more selections from formula (1-1) and one or more selections from formula (1-2). A combination of one or more selections from the compound group given by formulas (1-1) and (1-2) with one or more selections from the compound group given by formulas (3-1) to (3-5) may also be used.

As noted above, the hydrophobic segment R' preferably has 8 to 18 carbons because it then exhibits a high hydrophobicity and readily exhibits affinity with the magnetic core particle.

In addition, the compound preferably has a structure given by $(CH_2CH_2O)_n$ (n is an integer from 1 to 60) because it then exhibits a high affinity with the organosilicon polymer and the magnetic core particle/organosilicon polymer adherence is enhanced.

Unlike the compounds given by formulas (1-1), (1-2), and (2-1) to (2-5), a characteristic feature of the compound group given by formulas (3-1) to (3-5) is that these compounds do not have an ionized element. This facilitates a more enhanced charge stability as compared to the use of the compounds given by formulas (1-1), (1-2), and (2-1) to (2-5) and is thus more preferred. Moreover, the compound group given by formula (3-1) is particularly preferred in terms of charge stability.

Primer Treatment

Formation of the primer layer on the magnetic core particle surface prior to the magnetic core particle dispersion step is preferred from the standpoints of delamination of the organosilicon polymer coating layer, leakage suppression, and image stability.

The following method can be used to form the primer layer on the magnetic core particle surface: dilution of the vinyl polymer in a solvent; addition of this to the magnetic core particles; and removal of the solvent. The solvent used here may be any solvent capable of dissolving the vinyl polymer.

In the case of vinyl polymer soluble in organic solvent, the organic solvent can be exemplified by toluene, xylene, cellosolve butyl acetate, methyl ethyl ketone, methyl isobutyl ketone, and methanol.

There are no particular limitations on the method for forming the primer layer, and, for example, the treatment may be carried out using a coating method such as an immersion method, spray method, brush coating method, dry method, and fluidized bed. Among these, an immersion method is more preferred in terms of controlling the uniformity of the primer layer.

The following method is a preferred immersion method: addition to the magnetic core particles under reduced pressure conditions of a vinyl polymer solution provided by mixing vinyl polymer with solvent, and removal of the solvent by degassing and heating. The status of the vinyl polymer on the magnetic core particle surface can be controlled by controlling the solvent removal speed using the degassing rate and heating temperature.

The degree of the reduced pressure is preferably 10 mmHg to 700 mmHg. At equal to or greater than 10 mmHg, boiling by the vinyl polymer solution during the primer treatment step is inhibited and a good quality primer layer is formed.

The amount of vinyl polymer for the primer treatment is adjusted in conformity with the specific surface area of the magnetic core particles, but generally is preferably 0.1 part by mass to 3.0 parts by mass as the amount of vinyl polymer per 100 parts by mass of the magnetic core particles. 0.1 part by mass to 2.0 parts by mass is more preferred. The use of this range is preferred from the standpoint of increasing the adherence with the organosilicon polymer.

From the standpoint of increasing the adherence with the organosilicon polymer coating layer, the vinyl polymer used to form the primer layer preferably has the structure given by formula (1) above. By having the vinyl polymer have the structure given by the preceding formula (1), the adherence is increased due to the affinity between the ester segment of the vinyl polymer and the silanol moiety of the organosilicon polymer.

Monomer capable of forming the structure with formula (1) is specifically exemplified by acrylic acid, methyl acrylate, ethyl acrylate, methacrylic acid, methyl methacrylate, and ethyl methacrylate.

Monomer other than this may be incorporated as a constituent component of the vinyl polymer in order to adjust the glass transition temperature (Tg).

Known monomer may be used as this other monomer used as a constituent component of the coating resin composition, and the following are examples: styrene, ethylene, propylene, butylene, butadiene, vinyl chloride, vinylidene chloride, vinyl acetate, propyl methacrylate, vinyl methyl ether, vinyl ethyl ether, and vinyl methyl ketone.

Step of Coating Magnetic Core Particle Surface with Organosilicon Polymer

Methods will be described for forming the coating layer by coating the magnetic core particle surface with the organosilicon polymer, but this should not be understood as a limitation thereto.

A first production method is an embodiment in which the magnetic core particles are first obtained; the magnetic core particles are then introduced into an aqueous medium; and a coating layer of the organosilicon polymer is formed on the magnetic core particles in the aqueous medium.

A second production method is an embodiment in which a solvent, containing the organosilicon compound(s) for forming the organosilicon polymer on the magnetic core particle surface, is sprayed onto the magnetic core particle surface by a spray drying method and the magnetic core particle is coated with the organosilicon polymer by polymerizing or drying the surface using a hot air current and cooling.

The first production method is preferred between these production methods. The degree of condensation polymerization of the organosilicon compound(s) is easily controlled, and due to this the surface unevenness of the magnetic core particle is readily controlled.

The condensation step can be carried out using freely selected conditions for the pH, but condensation of the organosilicon compound is influenced by the pH of the aqueous medium. Due to this, the effects of the present disclosure can be increased still further by controlling the pH of the aqueous medium.

Under acidic conditions, hydrolysis of the alkoxy group proceeds electrophilically under proton catalysis and hydrolysis of the alkoxy groups in a molecule proceeds sequentially. Silanol groups thus readily remain in the condensate from the organosilicon compound(s) and hydrophobing progresses with difficulty. In addition, the occurrence of three-dimensional condensation reactions is impeded and an increase in the molecular weight is also impeded.

Under basic conditions, on the other hand, alkoxy group hydrolysis proceeds nucleophilically under catalysis by the hydroxide ion and hydrolysis of the alkoxy groups in a molecule proceeds in unison. It is thus difficult for silanol groups to remain in the condensate from the organosilicon compound(s) and hydrophobing readily progresses. In addition, the occurrence of three-dimensional condensation reactions is facilitated and the molecular weight readily increases. A large organosilicon polymer can be formed in the aqueous medium as a result.

When the organosilicon polymer assumes a high hydrophobicity, the stability in the aqueous medium becomes low and transfer to the magnetic core particle readily occurs. As a result, unevenness can be formed in the surface of the obtained magnetic carrier, and as a consequence the execution of the condensation step under basic conditions is preferred. In addition, when the condensation reaction is carried out under basic conditions, the organosilicon polymer readily assumes a high molecular weight and as a consequence the amount of organosilicon compound dissolved in the aqueous medium can be reduced. It is thus possible to decrease the organosilicon compound in the effluent, and this is also preferred from the standpoint of reducing the load imposed by wastewater treatment.

In specific terms, the pH of the aqueous medium in the condensation step is preferably from 7.5 to 12.0. From 8.0 to 11.0 is more preferred. The pH in the condensation step can be controlled using known acids and bases.

Acids for adjusting the pH can be exemplified by inorganic acids such as hydrochloric acid, sulfuric acid, nitric acid, boric acid, hydrofluoric acid, hydrobromic acid, permanganic acid, thiocyanic acid, phosphonic acid, phosphoric acid, diphosphoric acid, hexafluorophosphoric acid, tetrafluoroboric acid, and tripolyphosphoric acid, and organic acids such as aspartic acid, o-aminobenzoic acid, p-aminobenzoic acid, isonicotinic acid, oxaloacetic acid, citric acid, 2-glycerolphosphoric acid, glutamic acid, cyanoacetic acid, oxalic acid, trichloroacetic acid, o-nitrobenzoic acid, nitroacetic acid, picric acid, picolinic acid, pyruvic acid, fumaric acid, fluoroacetic acid, bromoacetic acid, o-bromobenzoic acid, maleic acid, and malonic acid.

These acids may be used without particular limitation. A single one of these acids may be used by itself, or two or more may be used in combination.

The base for adjusting the pH can be exemplified by alkali metals, e.g., lithium, sodium, and potassium, and their aqueous solutions; alkali metal salts and their aqueous solutions; alkaline-earth metals, e.g., calcium and magnesium, and their aqueous solutions; alkaline-earth metal salts; and amines including ammonia and urea.

Examples at a more specific level are aqueous lithium hydroxide solutions, aqueous sodium hydroxide solutions, aqueous potassium hydroxide solutions, aqueous calcium hydroxide solutions, aqueous magnesium hydroxide solutions, aqueous lithium carbonate solutions, aqueous sodium carbonate solutions, aqueous potassium carbonate solutions, aqueous ammonia solutions, urea, and so forth. These bases may be used without particular limitation. A single one of these bases may be used by itself, or two or more may be used in combination.

The 50% particle diameter on a volume basis (D50) of the magnetic carrier is preferably from 20.0 μm to 70.0 μm. This makes it possible to stop carrier attachment.

A magnetic carrier resistivity at an electric field strength of 1,000 V/cm, as provided by a resistivity measurement procedure, of from $1.0 \times 10^6$ Ω·cm to $1.0 \times 10^9$ Ω·cm can provide a high developing performance and is preferred from the standpoint of image stability.

In the development field, the magnetic carrier and toner are both exposed to a higher electric field strength, but the electric field strength is predominantly applied to the toner since it is an insulator. Due to this, the electric field strength applied to the magnetic carrier is lower and is an electric field strength of about 1,000 V/cm. As a consequence, preferably the resistivity is in the indicated range at an electric field strength of 1,000 V/cm.

Toner Production Methods

The toner incorporated with magnetic carrier in a two-component developer is described in the following.

The method for producing the toner particle in the toner can be exemplified by the following methods:

the pulverization method, in which the binder resin and optional additives such as colorant and wax are melt-kneaded and the kneaded material is cooled and then pulverized and classified;

the suspension granulation method, in which a solution, provided by the dissolution or dispersion in a solvent of the binder resin and optional additives such as colorant, is introduced into an aqueous medium with suspension and granulation, and the solvent is removed to obtain toner particles;

the suspension polymerization method, in which a monomer composition, provided by the dissolution or dispersion of optional additives, e.g., colorant, to uniformity in monomer, is dispersed in a continuous layer (for example, an aqueous phase) that contains a dispersion stabilizer, and toner particles are produced by carrying out a polymerization reaction;

the dispersion polymerization method, in which a polymeric dispersing agent is dissolved in an aqueous organic solvent and toner particles are obtained by producing solvent-insoluble particles through polymerization of monomer;

the emulsion polymerization method, in which toner particles are produced by direct polymerization in the presence of a water-soluble polar polymerization initiator; and the emulsion aggregation method, in which production is carried out via a step of aggregating at least polymer fine particles and optional colorant fine particles to form fine particle aggregates, and a maturation step of inducing melt-adhesion between the fine particles in these fine particle aggregates.

In the particular case of toner provided by the pulverization method, pulverization or pulverization/classification is preferably followed by the addition of inorganic fine particles with a large particle diameter of about 100 nm and modification of the toner surface by a thermal treatment; this is preferred because it enables the immobilization of the large-diameter fine particles, which are susceptible to being released during, for example, durability testing. The immobilization of large-diameter inorganic fine particles provides a spacer effect and improves the transferability.

The binder resin present in the toner can be exemplified by the following: polyesters; polystyrene; polymers of styrene derivatives, e.g., poly-p-chlorostyrene and polyvinyltoluene; styrene copolymers, e.g., styrene-p-chlorostyrene copolymer, styrene-vinyltoluene copolymer, styrene-vinylnaphthalene copolymer, styrene-acrylate ester copolymer, styrene-methacrylate ester copolymer, styrene-methyl α-chloromethacrylate copolymer, styrene-acrylonitrile copolymer, styrene-vinyl methyl ketone copolymer, styrene-butadiene copolymer, styrene-isoprene copolymer, and styrene-acrylonitrile-indene copolymer; as well as polyvinyl chloride, phenolic resins, modified phenolic resins, maleic resins, acrylic resins, methacrylic resins, polyvinyl acetate, and silicone resins; polyester resins having, as constituent units, monomer selected from aliphatic polyhydric alcohols, aliphatic dicarboxylic acids, aromatic dicarboxylic acids, aromatic dialcohols, and diphenols; and also polyurethane resins, polyamide resins, polyvinyl butyral, terpene resins, coumarone-indene resins, petroleum resins, and hybrid resins having a polyester unit and a vinyl polymer unit.

In order to have the toner storability coexist in balance with the low-temperature fixability of the toner, the peak molecular weight (Mp) in the molecular weight distribution for the binder resin, as measured by gel permeation chromatography (GPC), is preferably from 2000 to 50000. In addition, the binder resin preferably has a number-average molecular weight (Mn) from 1500 to 30000, a weight-average molecular weight (Mw) of from 2000 to 1000000, and a glass transition temperature (Tg) from 40° C. to 80° C.

The toner particle may contain a wax.

The wax is preferably used at from 0.5 parts by mass to 20.0 parts by mass per 100 parts by mass of the binder resin because this can provide a high-gloss image. In addition, the peak temperature of the maximum endothermic peak for the wax is preferably from 45° C. to 140° C. This is preferred because the toner storability can then coexist with the hot offset behavior of the toner.

The wax can be exemplified by the following: hydrocarbon waxes such as low molecular weight polyethylene, low molecular weight polypropylene, alkylene copolymers, microcrystalline wax, paraffin wax, and Fischer-Tropsch waxes; oxides of hydrocarbon waxes, such as oxidized polyethylene wax, and their block copolymers; waxes in which the major component is fatty acid ester, such as carnauba wax, behenyl behenate ester wax, and montanic acid ester wax; and waxes provided by the partial or complete deacidification of fatty acid esters, such as deacidified carnauba wax.

Among the preceding, hydrocarbon waxes such as Fischer-Tropsch waxes are preferred because they make it possible to provide a high-gloss image.

The toner particle may contain a colorant. The colorant can be exemplified by the following.

Black colorants can be exemplified by carbon black; magnetic bodies; and black colorant provided by color matching, using a yellow colorant, magenta colorant, and cyan colorant, to give a black color.

Magenta colorants can be exemplified by condensed azo compounds, diketopyrrolopyrrole compounds, anthraquinone compounds, quinacridone compounds, basic dye lake compounds, naphthol compounds, benzimidazolone compounds, thioindigo compounds, and perylene compounds.

Cyan colorants can be exemplified by the following: C.I. Pigment Blue 1, 2, 3, 7, 15:2, 15:3, 15:4, 16, 17, 60, 62, and 66; C.I. Vat Blue 6; C.I. Acid Blue 45; and copper phthalocyanine pigments in which 1 to 5 phthalimidomethyl groups are substituted on the phthalocyanine skeleton.

Yellow colorants can be exemplified by condensed azo compounds, isoindolinone compounds, anthraquinone compounds, azo-metal compounds, methine compounds, and allylamide compounds.

A pigment may be used by itself for the colorant, but bringing about an enhanced definition through the co-use of a dye and pigment is preferred in terms of the quality of the full color image.

The amount of use of the colorant, except for the case of use of a magnetic body, is preferably from 0.1 part by mass to 30.0 parts by mass and more preferably from 0.5 parts by mass to 20.0 parts by mass, per 100 parts by mass of the binder resin.

A charge control agent may also be incorporated in the toner on an optional basis. Known charge control agents can be used as this charge control agent. Preferred are metal compounds of aromatic carboxylic acids that are colorless, provide a fast toner charging speed, and can stably maintain a certain charge quantity. The charge control agent may be internally added or externally added to the toner particle. The amount of addition for the charge control agent is preferably from 0.2 parts by mass to 10 parts by mass per 100 parts by mass of the binder resin.

An external additive is preferably added to the toner in order to improve the flowability. The external additive is preferably an inorganic fine particle such as silica, titanium oxide, or aluminum oxide. The inorganic fine particle is preferably hydrophobed with a hydrophobing agent such as a silane compound, silicone oil, or their mixture.

The external additive is preferably used at from 0.1 part by mass to 5.0 parts by mass per 100 parts by mass of the toner particle. A known mixer, such as a Henschel mixer, may be used to mix the toner particle and external additive.

A toner production procedure using the pulverization method will be described.

In a starting material mixing step, the materials constituting the toner particle, e.g., the binder resin and optional other components such as colorant, wax, charge control agent, and so forth, are metered out in prescribed quantities and are blended and mixed.

The mixing apparatus can be exemplified by a double cone mixer, V-mixer, drum mixer, Supermixer, Henschel mixer, Nauta mixer, and Mechano Hybrid (Mitsui Mining Co., Ltd.).

The mixed materials are then melt-kneaded to disperse the colorant and so forth in the binder resin. A batch kneader, e.g., a pressure kneader, Banbury mixer, and so forth, or a continuous kneader can be used in this melt-kneading step. Single-screw extruders and twin-screw extruders represent the mainstream here because they offer the advantage of enabling continuous production.

Examples here are the Model KTK twin-screw extruder (Kobe Steel, Ltd.), Model TEM twin-screw extruder (Toshiba Machine Co., Ltd.), PCM kneader (Ikegai Ironworks Corporation), Twin Screw Extruder (KCK), Co-Kneader (Buss), and Kneadex (Mitsui Mining Co., Ltd.).

The colored resin composition yielded by melt kneading may additionally be rolled out using, for example, a two-roll mill, and cooled in a cooling step, for example, with water.

The cooled resin composition is then pulverized in a pulverization step to a desired particle diameter. In the pulverization step, for example, a coarse pulverization is performed using a grinder such as a crusher, hammer mill, or feather mill, followed by a fine pulverization using, for example, a pulverizer such as a Kryptron System (Kawasaki Heavy Industries, Ltd.), Super Rotor (Nisshin Engineering Inc.), or Turbo Mill (Turbo Kogyo Co., Ltd.) or using an air jet system.

The toner particle is then obtained as necessary by carrying out classification using a sieving apparatus or a classifier, e.g., an internal classification system such as the Elbow Jet (Nittetsu Mining Co., Ltd.) or a centrifugal classification system such as the Turboplex (Hosokawa Micron Corporation), TSP Separator (Hosokawa Micron Corporation), or Faculty (Hosokawa Micron Corporation).

After pulverization, the toner particle may also optionally be subjected to a surface modification treatment, such as a spheronizing treatment, using a Hybridization System (Nara Machinery Co., Ltd.), Mechanofusion System (Hosokawa Micron Corporation), Faculty (Hosokawa Micron Corporation), or Meteo Rainbow MR Type (Nippon Pneumatic Mfg. Co., Ltd.).

In addition, prior to the surface modification treatment, inorganic fine particles may optionally be added, using a mixer as described in the preceding.

The toner particle may be used as such as toner. Viewed from the standpoint of imparting flowability to the toner particle, inorganic fine particles may be added using a mixer as described above. The toner preferably has a toner particle and inorganic fine particles on the toner particle surface.

The coverage ratio of the toner by the inorganic fine particles is preferably from 10% to 80% and is more preferably from 25% to 65%.

Method for Producing Two-Component Developer

The two-component developer contains toner and the magnetic carrier described above, and the toner comprises a toner particle containing a binder resin.

The mixing ratio between the toner and magnetic carrier in the two-component developer is preferably from 2 parts by mass to 15 parts by mass and more preferably from 4 parts by mass to 12 parts by mass of the toner per 100 parts by mass of the magnetic carrier. The use of this range serves to reduce toner scattering and to provide a stable triboelectric charge quantity on a long-term basis.

The two-component developer is prepared by metering out the magnetic carrier and toner in the desired amounts and mixing using a mixer. The mixing device can be exemplified by the double cone mixer, V-mixer, drum mixer, Supermixer, Henschel mixer, and Nauta mixer. Among these, the V-mixer is preferred from the standpoint of magnetic carrier dispersibility.

The methods used to measure the various properties are described herebelow.

Method for Confirming Substructure Given by Formula (T3)

The following method is used to confirm the structure represented by formula (T3) in the organosilicon polymer contained in the magnetic carrier.

The presence/absence of the alkyl group, phenyl group, or alkylamino group represented by R in formula (T3) is confirmed by $^{13}$C-NMR. The detailed structure for formula (T3) is confirmed using $^{1}$H-NMR, $^{13}$C-NMR, and $^{29}$Si-NMR. The instrument used and the measurement conditions are given below.

Measurement Conditions
Instrument: AVANCE III 500 from Bruker
Probe: 4 mm MAS BB/$^{1}$H
Measurement temperature: room temperature
Sample spinning rate: 6 kHz
Sample: 150 mg of the measurement sample (tetrahydrofuran THF-insoluble matter from the organosilicon polymer submitted to NMR measurement) is introduced into a sample tube having a diameter of 4 mm.

The presence/absence of the alkyl group, phenyl group, or alkylamino group represented by R in formula (T3) is confirmed using this method. When a signal can be identified, the structure with formula (T3) is scored as "present".

Measurement Conditions for $^{13}$C-NMR (Solid State)
Measurement nucleus frequency: 125.77 MHz
Reference substance: glycine (external reference: 176.03 ppm)
Observation width: 37.88 kHz
Measurement method: CP/MAS
Contact time: 1.75 ms
Repeat time: 4 s
Number of scans: 2048
LB value: 50 Hz Measurement Conditions for $^{29}$Si-NMR (Solid State)
Measurement Conditions
Instrument: AVANCE III 500 from Bruker
Probe: 4 mm MAS BB/$^{1}$H
Measurement temperature: room temperature
Sample spinning rate: 6 kHz
Sample: 150 mg of the measurement sample (tetrahydrofuran-insoluble matter from the organosilicon polymer submitted to NMR measurement) is introduced into a sample tube having a diameter of 4 mm.
Measurement nucleus frequency: 99.36 MHz
Reference substance: DSS (external reference: 1.534 ppm)
Observation width: 29.76 kHz
Measurement method: DD/MAS, CP/MAS
29Si 90° pulse width: 4.00 μs@-1 dB
Contact time: 1.75 ms to 10 ms
Repeat time: 30 s (DD/MAS), 10 s (CP/MAS)
Number of scans: 2048
LB value: 50 Hz Method for Calculating Proportion, in Organosilicon Polymer Contained in Magnetic Carrier, of Substructure Represented by Formula (T3) (T3 Structure) and Structure for Which Number of Silicon-bonded $O_{1/2}$ Is 2.0 (SX2 Structure)

The T3 structure, X1 structure, X2 structure, X3 structure, and X4 structure can be identified by $^{1}$H-NMR, $^{13}$C-NMR, and $^{29}$Si-NMR.

After the $^{29}$Si-NMR measurement on the tetrahydrofuran-insoluble matter of the organosilicon polymer, peak separation is performed, by curve fitting the plurality of silane components having different substituent groups and bonding groups for the magnetic carrier, into the X4 structure represented by the following formula (X4) and having 4.0 for the number of silicon-bonded $O_{1/2}$, the X3 structure represented by the following formula (X3) and having 3.0 for the number of silicon-bonded $O_{1/2}$, the X2 structure represented by the following formula (X2) and having 2.0 for the number of silicon-bonded $O_{1/2}$, the X1 structure represented by the following formula (X1) and having 1.0 for the number of silicon-bonded $O_{1/2}$, and the T unit structure given by formula (T3), and the mol % for the individual components is calculated from the area ratios of the respective peaks.

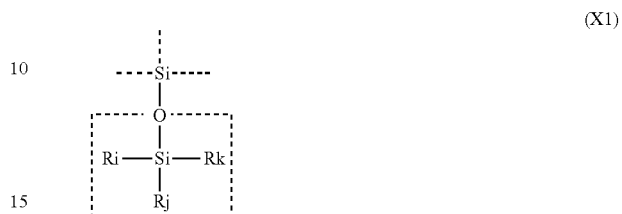
(X1)

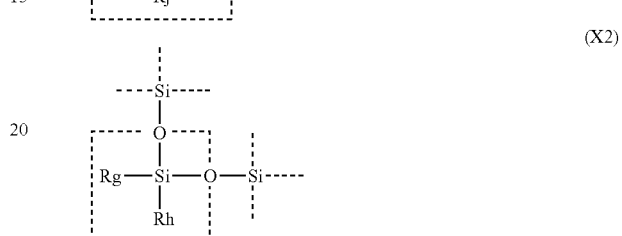
(X2)

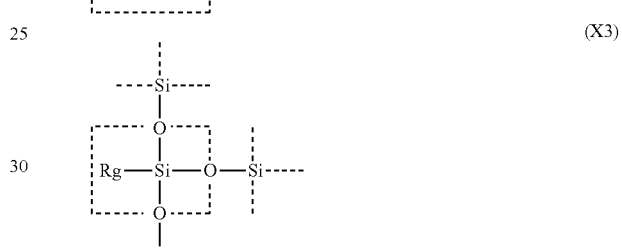
(X3)

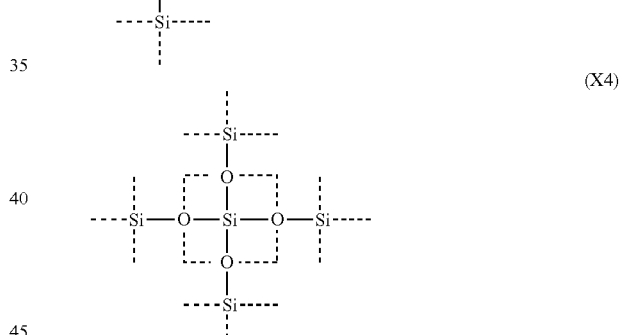
(X4)

(The Ri, Rj, Rk, Rg, Rh, and Rf in the formulas represent a silicon-bonded organic group, halogen atom, hydroxy group, or alkoxy group.)

The EXcalibur for Windows (product name) version 4.2 (EX series) software for the JNM-EX400 from JEOL Ltd. is used for curve fitting. "1D Pro" is clicked from the menu icon and the measurement data is loaded.

Curve fitting is then carried out by selecting "Curve fitting function" from "Command" on the menu bar. An example of this is given in The FIGURE. Peak resolution is carried out so as to minimize the peaks in the synthetic peak differential (a), which is the differential between the synthetic peaks (b) and the measurement results (d).

The area for the X1 structure, the area for the X2 structure, the area for the X3 structure, and the area for the X4 structure are determined, and SX1, SX2, SX3, and SX4 are determined using the formulas given below.

The silane monomer is identified from the chemical shift value, and the total peak area for the organosilicon polymer is taken to be the sum of the area for the X1 structure, the area for the X2 structure, the area for the X3 structure, and the area for the X4 structure, as provided by removing the monomer component from the total peak area in the $^{29}$Si-NMR measurement.

SX1+SX2+SX3+SX4=1.00

SX1={area for X1 structure/(area for X1 structure+ area for X2 structure+area for X3 structure+ area for X4 structure)}

SX2={area for X2 structure/(area for X1 structure+ area for X2 structure+area for X3 structure+ area for X4 structure)}

SX3={area for X3 structure/(area for X1 structure+ area for X2 structure+area for X3 structure+ area for X4 structure)}

SX4={area for X4 structure/(area for X1 structure+ area for X2 structure+area for X3 structure+ area for X4 structure)}

ST3={area for T3 structure/(area for X1 structure+ area for X2 structure+area for X3 structure+ area for X4 structure)}

The chemical shift values for the silicon in the X1 structure, X2 structure, X3 structure, and X4 structure are given below.

Example for the X1 structure (Ri=Rj=—OC$_2$H$_5$, Rk=—CH$_3$): −47 ppm

Example for the X2 structure (Rg=—OC$_2$H$_5$, Rh=—CH$_3$): −56 ppm

Example for the X3 structure (Rf=—CH$_3$): −65 ppm

The chemical shift value for the silicon in the case of the X4 structure is as follows.

X4 structure: −108 ppm

Method for Separating Organosilicon Polymer Contained in Magnetic Carrier

In order to obtain the THF-insoluble matter of the organosilicon polymer from the magnetic carrier, the magnetic core particle is first eluted with a strong acid; the residual organosilicon polymer is dried; and THF is then added and the THF-insoluble matter is obtained.

Method for Measuring Concentration of Element Silicon Present at Magnetic Carrier Surface X-ray photoelectron spectroscopic analysis (ESCA) is used to measure the concentration (atom %) of the element silicon relative to the total concentration (dC+dO+dSi) for the concentration dSi of the element silicon, the concentration dO of the element oxygen, and the concentration dC of the element carbon present at the magnetic carrier surface.

The ESCA instrument and measurement conditions are as follows.
Instrument used: Quantum 2000 from ULVAC-PHI, Inc.
Measurement conditions with the x-ray photoelectron spectroscopic instrument:
x-ray source: Al Kα
x-ray: 100 μm, 25 W, 15 kV
Raster: 300 μm×200 μm
Pass energy: 58.70 eV
Step size: 0.125 eV
Neutralization electron gun: 20 μA, 1 V
Ar ion gun: 7 mA, 10V
Sweep number: Si 15 times, C 10 times, O 5 times Using the relative sensitivity factors provided by PHI, the surface atomic concentrations (atom %) are calculated from the peak intensities measured for the individual elements.

Measurement of Arithmetic Mean Surface Roughness Ra of Unevenness in Surface of Magnetic Carrier The magnetic carrier is mounted on a sample plate and magnetic carrier having a particle diameter present in the range of the volume-average particle diameter of the magnetic carrier±10% is selected.

Using a violet laser microscope (Model "VK-9500", Keyence Corporation), the roughness curve is measured on 4 μm of the magnetic carrier particle surface. The measurement is carried out under conditions of a lens magnification of 150×, an optical zoom of 20×, a pitch of 0.05 μm, and a curvature cutoff of equal to or greater than 0.08 mm, and the arithmetic mean surface roughness Ra is determined using three-dimensional surface texture analysis software (product name: "SurftopEye", Mitani Corporation).

Ra is determined on each of 100 of the magnetic carriers, and the arithmetic mean value thereof is used as Ra in the present invention.

Mean Width (RSm) of Roughness Curve Elements of Magnetic Carrier Particles and Standard Deviation σ of Width of Region where One Period of Unevenness Occurs The measurement is performed using the following measurement instrumentation and measurement conditions.
Scanning probe microscope: from Hitachi High-Tech Science Corporation
Measurement unit: E-sweep
Measurement mode: DFM (resonance mode) profile image
Resolution: X data 256, Y data 128
Measurement area: 1 μm square
Target particle for measurement: Particles are selected that have a particle diameter present in the range of the volume-average particle diameter of the magnetic carrier±10%.

RSm and σ are determined as follows for each magnetic carrier particle.

Ten cross sections (cross section 1 to cross section 10) are randomly selected from the 1 μm square measurement area being measured. The description here will use cross section 1 as an example. Based on the mean line in the roughness curve, the width RSm$_i$ of the region where one period of a protrusion and a recess occurs, is measured for all of the protrusion-recess periods. The mean width RSm' is calculated for the roughness curve elements using the following formula.

$$RSm' = \frac{1}{n}\sum_{i=1}^{n} RSm_i$$

n: sum of the number of protrusion-recess periods in the roughness curve

This RSm' is calculated for all of cross section 1 to cross section 10. The same measurement is performed on 10 magnetic carrier particles. The mean value thereof is calculated and is used as the mean width (RSm) of the roughness curve elements in the present invention.

The standard deviation σ of the width RSm$_i$ of the region where one period of a protrusion and a recess occurs (=σRSm') is defined as follows.

$$\sigma RSm' = \sqrt{\frac{\sum_{i=1}^{n}(Rsm_i - RSm')^2}{n-1}}$$

Method for Quantitating Amount of Vinyl Polymer Contained in Magnetic Carrier

The amount of vinyl polymer from the magnetic carrier can be measured using the following method.

A: A 100-mL beaker is exactly weighed (measurement value 1); approximately 5 g of the sample to be measured is introduced; and the total mass of the sample and beaker is exactly weighed (measurement value 2).

B: Approximately 50 mL of toluene is introduced into the beaker and shaking is performed for 5 minutes using an ultrasound shaker.

C: After standing at quiescence for several minutes after the completion of shaking, the sample in the beaker is stirred using a neodymium magnet so as to be moved around the bottom of the beaker twenty times, and only the toluene solution, in which the vinyl polymer is dissolved, is then discharged as a discard solution.

D: With the sample in the beaker being held in place by the neodymium magnet from the outside, approximately 50 mL of toluene is again introduced into the beaker, and the procedure in B and C is carried out 10 times.

E: The solvent is changed over to chloroform, and the procedure of B and C is carried out once.

F: The beaker and all is placed in a vacuum dryer and the solvent is dried off and removed (a vacuum dryer equipped with a solvent trap is used, and drying is carried out for a drying time of 12 hours at a temperature of 50° C. and a vacuum of equal to or less than −0.093 MPa).

G: The beaker is removed from the vacuum dryer and is allowed to stand for approximately 20 minutes and then cooled, and the mass is subsequently exactly weighed (measurement value 3).

H: The amount (mass %) of the coating resin is calculated using the following formula from the measurement values obtained in accordance with the preceding.

Amount of vinyl polymer (mass %)=(mass of the sample−mass of the sample after dissolution of the vinyl polymer)/mass of the sample×100

In the formula, the mass of the sample is determined by calculation of (measurement sample 2−measurement sample 1), and the mass of the sample after dissolution of the vinyl polymer is determined by calculation of (measurement value 3−measurement value 1).

Abraded Amount of Coating Layer in Degradation Test with Magnetic Carrier 92.0 parts of the magnetic carrier is mixed with 8.0 parts of the toner using a V-mixer (V-20, Seishin Enterprise Co., Ltd.) to provide the two-component developer.

A modified imageRUNNER ADVANCE C5560 from Canon, Inc. is used as the image-forming apparatus, and the two-component developer is introduced into the developing device at the cyan position. The apparatus is modified as follows: the fixation temperature, process speed, direct-current voltage $V_{DC}$ of the developer carrying member, charging voltage $V_D$ of the electrostatic latent image bearing member, and laser power are altered so as to be freely settable. In the image output evaluation, an FFh image (solid image) with the desired image ratio is output; the $V_{DC}$, $V_D$, and laser power are adjusted to provide the desired toner laid-on level for the FFh image on the paper; and the following durability test is run.

10000 Prints of the image described below were output in the durability test.

Paper: GFC-081 (81.0 g/m²) (Canon Marketing Japan Inc.)
Toner laid-on level on the paper prior to the durability test: 0.35 mg/cm²

(Adjusted prior to the durability test using the direct-current voltage $V_{DC}$ of the developer carrying member, charging voltage $V_D$ of the electrostatic latent image bearing member, and laser power. Not changed during the durability test or after the durability test.)

Evaluation image: an FFh strip chart image with an image ratio of 1% is positioned in the center of the A4 paper specified above Fixing test environment: high-temperature, high-humidity environment: temperature 30° C./humidity 80% RH ("H/H" below)

Process speed: 377 mm/sec

The abraded amount is determined by fluorescent x-ray measurement (wavelength-dispersive fully automatic fluorescent x-ray analyzer, PANalytical) of the amount of Si for the initial magnetic carrier and for the magnetic carrier separated after the durability test.

abraded amount of the amount of the organosilicon polymer=(initial amount of organosilicon polymer−amount of organosilicon polymer after agitation)/initial amount of organosilicon polymer×100

A toner identical to the toner 1 in the examples, infra, is used as the toner.

The fluorescent x-ray measurement procedure is as follows.

The "SuperQ ver. 4.0F" (PANalytical) dedicated software provided with the instrument is used to set the measurement conditions and analyze the measurement data.

A special-purpose film is pasted into a special-purpose powder measurement cup, as recommended by PANalytical, and 10 g of the sample is weighed into this and the determination is performed by the FP method in an atmospheric pressure He atmosphere.

The measurement is performed using the conditions indicated above, and the elements are identified based on the positions of the resulting x-ray peaks; their concentrations are calculated from the count rate (unit: cps), which is the number of x-ray photons per unit time.

Coverage Ratio of Toner by Inorganic Fine Particles

The coverage ratio by the inorganic fine particles is determined from the amount of silicon (abbreviated as Si in the following) atoms originating with the silica present on the toner particle surface, as measured by x-ray photoelectron spectroscopic analysis (ESCA).

ESCA is an analytical method that detects atoms in the region of not more than several nanometers in the thickness direction from the sample surface. It can thus detect atoms at the surface of the toner particle. A platen with a 75 mm angle (equipped with a screw hole with a diameter of about 1 mm for fixing the sample), provided with the instrument, is used as the sample holder. Since the screw hole in the platen is a penetrating screw hole, the hole is closed with, e.g., a resin, to prepare a recess for powder measurement having a depth of about 0.5 mm. The measurement sample is packed in the recess using, e.g., a spatula, and is levelled off to prepare a sample.

The ESCA instrument and measurement conditions are as follows.

Instrument used: PHI 5000 VersaProbe II, Ulvac-Phi, Inc.
Analysis method: narrow analysis
Measurement conditions:
x-ray source: Al-Kα
x-ray conditions: 100 μm, 25 W, 15 kV
Photoelectron extraction angle: 45°
Pass energy: 58.70 eV
Measurement range: 300 μm×200 μm The measurement is performed using these conditions. In the analysis process, the peak originating with the C—C bond of the carbon 1s orbital is first corrected to 285 eV. Then, using the relative sensitivity factors provided by Ulvac-Phi, Inc., the amount of Si originating with silica relative to the total amount of constituent elements is determined from the peak area originating with the silicon 2p orbital, for which the peak top is detected at from 100 eV to 105 eV.

The silica as such used for the toner is then measured using the same method as above; the amount of silica-originating Si relative to the total amount of the constituent elements is determined; and the silica coverage ratio is taken to be the ratio of the amount of Si when the toner is measured to the amount of Si when the external additive as such is measured.

EXAMPLES

The present invention is more specifically described in the examples that follow, but these in no way limit the present invention. In the formulations given in the following, parts is on a mass basis unless specifically indicated otherwise.

Magnetic Core Particle 1 Production Example

Irregularly Shaped Magnetic Particle (a) Production Example $Fe_3O_4$ was mixed and pulverized for 10 hours using a wet ball mill 1 part of polyvinyl alcohol was added to 100 parts of the $Fe_3O_4$, and granulation and drying were carried out using a spray dryer. Firing was performed in an electric furnace for 10 hours at 900° C. in a nitrogen atmosphere having an oxygen concentration of 0.0 volume %.

The obtained magnetic body was pulverized for 5 hours using a dry ball mill. Classification was performed using an air classifier (Elbow Jet Labo EJ-L3, Nittetsu Mining Co., Ltd.) and the fines and coarse powder were classified and removed simultaneously to obtain an irregularly shaped magnetic particle (a) having a number-average particle diameter of 1.7 μm.

Preparation of Irregularly Shaped Magnetic Particle A

100 L of a slurry containing 90 g/L of the aforementioned irregularly shaped magnetic particle (a) having a number-average particle diameter adjusted to 1.7 μm, was adjusted to pH 8.5 at a temperature of 90° C. by the addition of a sodium hydroxide solution; this was followed by the addition over 190 minutes of 30 L of a 2.5 mol/L aqueous manganese sulfate solution and an aqueous sodium hydroxide solution to adjust to pH 8.5±0.2 at the same time. Then, after maturation for 60 minutes, dilute sulfuric acid was added to adjust to pH 7.0, followed by filtration, washing with water, and drying to obtain an Mn-surface-treated irregularly shaped magnetic particle A.

The obtained irregularly shaped magnetic particle A and a silane coupling agent (3-(2-aminoethylamino)propyltrimethoxysilane) (0.2 parts per 100 parts of particle A) were introduced into a container. A surface treatment was carried out in the container by high-speed mixing and stirring for 1 hour at 100° C. to obtain an irregularly shaped magnetic particle A for use for dispersed magnetic body-type magnetic core particle 1.

Irregularly Shaped Magnetic Particle (b) Production Example $Fe_3O_4$ was mixed and pulverized for 10 hours using a wet ball mill 1 part of polyvinyl alcohol was added to 100 parts of the $Fe_3O_4$, and granulation and drying were carried out using a spray dryer. Firing was performed in an electric furnace for 10 hours at 900° C. in a nitrogen atmosphere having an oxygen concentration of 0.0 volume %.

The obtained magnetic body was pulverized for 10 hours using a dry ball mill Classification was performed using an air classifier (Elbow Jet Labo EJ-L3, Nittetsu Mining Co., Ltd.) and the fines and coarse powder were classified and removed simultaneously to obtain an irregularly shaped magnetic particle (b) having a number-average particle diameter of 0.3 μm.

Preparation of Irregularly Shaped Magnetic Particle B

The obtained irregularly shaped magnetic particle (b) and a silane coupling agent (3-glycidoxypropylmethyldimethoxysilane) (1.2 parts per 100 parts of particle b) were introduced into a container. A surface treatment was carried out in the container by high-speed mixing and stirring for 1 hour at 100° C. to obtain an irregularly shaped magnetic particle B for use for dispersed magnetic body-type magnetic core particle 1.

Dispersion Step

Phenol: 10.0 parts
Formaldehyde solution (37 mass % aqueous solution of formaldehyde): 15.0 parts
Irregularly shaped magnetic particle A: 10.0 parts
Irregularly shaped magnetic particle B: 90.0 parts
25 mass % aqueous ammonia: 3.5 parts
Water: 15.0 parts These materials were introduced into a reaction kettle and were brought to a temperature of 40° C. and were thoroughly mixed. Then, while stirring, heating was carried out to a temperature of 85° C. at an average ramp rate of 1.5° C./minute, and, while holding at a temperature of 85° C., curing was performed by carrying out a polymerization reaction for 3 hours. The peripheral velocity of the stirring blades during this process was made 1.96 m/second.

After the polymerization reaction, cooling to a temperature of 30° C. was carried out and water was added. The supernatant liquid was removed and the obtained precipitate was washed with water and air dried. The resulting air-dried material was dried for 5 hours at 180° C. under reduced pressure (equal to or less than 5 mmHg) to obtain dispersed magnetic body-type magnetic core particle 1. The D50 of the dispersed magnetic body-type magnetic core particle 1 was 43.1 μm.

Magnetic Core Particle 2 Production Example

Step 1 (Weighing and Mixing Step)

$Fe_2O_3$ 70.4 parts
$MnCO_3$ 25.0 parts
$Mg(OH)_2$ 3.5 parts
$SrCO_3$ 1.1 parts These ferrite starting materials were weighed out; 20 parts water was added to 100 parts of the ferrite starting materials; and a slurry was then prepared by wet mixing for 3 hours using a ball mill and zirconia with a diameter (ϕ) of 10 mm. The solids fraction concentration in the slurry was 80 mass %.

Step 2 (Prefiring Step)

The mixed slurry was dried using a spray dryer (Ohkawara Kakohki Co., Ltd.), followed by firing in a batch electric furnace for 3.0 hours at a temperature of 1070° C. in a nitrogen atmosphere (1.0 volume % oxygen concentration) to produce a prefired ferrite.

Step 3 (Pulverization Step)

The prefired ferrite was pulverized to approximately 0.5 mm using a crusher, and water was then added to prepare a slurry. The solids fraction concentration of this slurry was brought to 70 mass %. Milling was carried out for 3.5 hours using a wet ball mill and 1/8-inch stainless steel beads to obtain a slurry. This slurry was additionally milled for 4 hours using a wet bead mill and zirconia with a diameter of 1 mm to obtain a prefired ferrite slurry having a 50% particle diameter on a volume basis (D50) of 1.1 µm.

Step 4 (Granulation Step)

1.0 parts of ammonium polycarboxylate as a dispersing agent and 1.5 parts of polyvinyl alcohol as a binder were added to 100 parts of the prefired ferrite slurry, followed by granulation into spherical particles and drying using a spray dryer (Ohkawara Kakohki Co., Ltd.). The particle size of the obtained granulate was adjusted followed by heating for 2 hours at 720° C. using a rotary electric furnace to remove the organic component, e.g., the dispersing agent and binder.

Step 5 (Firing Step)

Firing was carried out in a nitrogen atmosphere (0.3 volume % oxygen concentration) using 1.7 hours for the time from room temperature to the firing temperature (1250° C.) and holding for 4.5 hours at a temperature of 1300° C. This was followed by dropping the temperature to a temperature of 60° C. over 8 hours, returning the nitrogen atmosphere to the atmosphere, and removing at a temperature not above 40° C.

Step 6 (Screening Step)

The aggregated particles were crushed; the coarse particles were then removed by screening across a screen with an aperture of 150 µm; the fines were removed using air classification; and the weakly magnetic component was removed by magnetic screening to obtain magnetic core particle 2. The D50 of the obtained magnetic core particle 2 was 41.3 µm.

Magnetic Core Particle 3 Production Example $Fe_2O_3$ 69.3 parts
$MnCO_3$ 27.5 parts
$Mg(OH)_2$ 1.7 parts
$SrCO_3$ 1.5 parts A reaction was run as in the Magnetic Core Particle 2 Production Example, but changing the starting materials as indicated above and changing Step 5 (Firing Step) to an oxygen concentration of 1.0 volume % and a firing temperature of 1150° C., thus yielding a pre-filled porous magnetic core particle 3 for use for magnetic core particle 3.

Filling Resin Composition Production Example

Methylsilicone oligomer (KR-400, Shin-Etsu Silicone Co., Ltd.) 95.0 parts
γ-Aminopropyltriethoxysilane (KBM-903, Shin-Etsu Silicone Co., Ltd.) 5.0 parts These materials were mixed to obtain a filling resin composition 1.

Filling Step 100 parts of the pre-filled porous magnetic core particle 3 was introduced into the stirring container of a mixer/stirrer (Model NDMV All-Purpose Stirrer, Dalton Corporation), and 6 parts of the filling resin composition 1 was added dropwise at normal pressure while holding the temperature at 60° C.

After completion of the dropwise addition, stirring was continued while adjusting the time, and the temperature was raised to 70° C. to fill the resin composition into the particles of the pre-filled porous magnetic core particle 3.

After cooling, the resulting resin-filled magnetic core particles were transferred to a mixer having a spiral impeller in a rotatable mixing container (Model UD-AT drum mixer, Sugiyama Heavy Industrial Co., Ltd.), and the temperature was raised under a nitrogen atmosphere at a ramp rate of 2° C./minute to a curing temperature of 140° C. while stirring. This was followed by continuing to heat and stir at 140° C. for a curing time of 50 minutes.

This was followed by cooling to room temperature, removal of the resin-filled magnetic core particles, as provided by filling with and curing of the resin, and removal of the weakly magnetic material using a magnetic screener. The coarse particles were removed on a vibrating screen to obtain a resin-filled magnetic core particle 3. The D50 of the resin-filled magnetic core particle 3 was 41.3 µm.

Vinyl Polymer 1 Production Example

Solvent: toluene 50.0 parts
Solvent: methyl ethyl ketone 50.0 parts
Monomer composition 100.0 parts
(the monomer composition is a mixture of cyclohexyl methacrylate and methyl methacrylate in the proportions indicated in the following)
Cyclohexyl methacrylate 62.7 parts (49.4 mol %)
Methyl methacrylate 38.3 parts (50.6 mol %)
Polymerization initiator: azobisisobutyronitrile 2.0 parts These materials were introduced under a nitrogen atmosphere into a reactor equipped with a reflux condenser, stirrer, thermometer, and nitrogen introduction line. While stirring in the reactor at 200 rpm, a polymerization reaction was run for 5 hours with heating to 80° C. to obtain a solution in which a vinyl polymer 1 of the monomer composition was dissolved. This solution was then cooled to 25° C. followed by the introduction of the solution while stirring into 1000.0 parts of methanol to precipitate methanol-insoluble matter. The resulting methanol-insoluble matter was filtered off and was additionally washed with methanol, followed by vacuum drying for 24 hours at 40° C. to yield a vinyl polymer 1.

According to analysis by NMR, this vinyl polymer 1 contained 49.4 mol % monomer unit derived from cyclohexyl methacrylate and 50.6 mol % monomer unit derived from methyl methacrylate.

Vinyl Polymer 2 and Vinyl Polymer 3 Production Example

Vinyl polymers 2 and 3 were obtained by carrying out reactions as in the Vinyl Polymer 1 Production Example, but changing the polymerizable monomer and number of parts in each case as shown in Table 1.

TABLE 1

| Vinyl polymer | Polymerizable monomer 1 | | | Polymerizable monomer 2 | | |
|---|---|---|---|---|---|---|
| | Type | mass [parts] | mol % | Type | mass [parts] | mol % |
| 1 | CHMA | 62.1 | 49.4 | MMA | 37.9 | 50.6 |
| 2 | CHMA | 58.9 | 49.4 | EMA | 41.1 | 50.6 |
| 3 | CHMA | 100.0 | 100.0 | — | — | — |

The abbreviations in Table 1 represent the following.

CHMA: cyclohexyl methacrylate
MMA: methyl methacrylate
EMA: ethyl methacrylate

Vinyl Polymer Solution 1 Production Example

Vinyl polymer 1: 10.0 parts
Solvent: toluene: 50.0 parts
Solvent: methyl ethyl ketone: 40.0 parts
These materials were introduced into a stirrer-equipped reactor and vinyl polymer 1 was dissolved to obtain vinyl polymer solution 1 (10 mass % solids fraction).

Vinyl Polymer Solutions 2 and 3 Production Example

Vinyl polymer solutions 2 and 3 were obtained by carrying out dissolution proceeding as in the Vinyl Polymer Solution 1 Production Example, but changing the vinyl polymer to vinyl polymer 2 or 3, respectively.

Dispersion Stabilizer Aqueous Solution 1 Production Example

Aqueous $Na_3PO_4$ solution (0.1 mol/liter) 100.0 parts
Deionized water 70.0 parts
Aqueous HCl solution (1.0 mol/liter) 2.4 parts
These materials were introduced into a reactor equipped with a reflux condenser and thermometer. Holding at 60° C. was then performed while stirring the reactor at 12000 rpm using a TK Homomixer high-speed stirrer.
Aqueous $CaCl_2$ solution (1.0 mol/liter) 85.0 parts
This material was then gradually added to obtain the dispersion stabilizer aqueous solution 1, which contained the microfine sparingly water-soluble dispersion stabilizer $Ca_3(PO_4)_2$.

Silane Compound Hydrolysis Solution 1 Production Example

3-Aminopropyltriethoxysilane 10.0 parts
Methyltriethoxysilane 36.0 parts
Deionized water 54.0 parts
These materials were introduced into a reactor equipped with a stirrer; the pH was adjusted to 3.0 using 10 mass % hydrochloric acid; and hydrolysis was carried out while stirring to obtain silane compound hydrolysis solution 1. The completion of hydrolysis was confirmed when the solution, which was initially separated into two phases, became a single phase.

Silane Compound Hydrolysis Solutions 2 to 16 Production Example

Silane compound hydrolysis solutions 2 to 16 were obtained by carrying out a reaction proceeding as in the Silane Compound Hydrolysis Solution 1 Production Example, but respectively changing the silane compound as indicated in Table 2.

TABLE 2

| Silane compound hydrolysis solution No. | Silane compound ① Type | [parts] | Silane compound ② Type | [parts] | Deionized water [parts] |
|---|---|---|---|---|---|
| 1 | 3-Aminopropyltriethoxysilane | 10.0 | Methyltriethoxysilane | 40.0 | 50.0 |
| 2 | — | — | Methyltriethoxysilane | 50.0 | 50.0 |
| 3 | — | — | Phenyltriethoxysilane | 50.0 | 50.0 |
| 4 | 3-Aminopropyltriethoxysilane | 7.0 | Methyltriethoxysilane | 43.0 | 50.0 |
| 5 | N-2-(Aminoethyl)-3-aminopropyltrimethoxysilane | 10.0 | Methyltriethoxysilane | 40.0 | 50.0 |
| 6 | N-2-(Aminoethyl)-3-aminopropyltrimethoxysilane | 11.0 | Methyltriethoxysilane | 39.0 | 50.0 |
| 7 | N-2-(Aminoethyl)-3-aminopropyltrimethoxysilane | 20.0 | Methyltriethoxysilane | 30.0 | 50.0 |
| 8 | 3-Aminopropyltriethoxysilane | 6.0 | Methyltriethoxysilane | 44.0 | 50.0 |
| 9 | N-2-(Aminoethyl)-3-aminopropyltrimethoxysilane | 21.0 | Methyltriethoxysilane | 29.0 | 50.0 |
| 10 | N-2-(Aminoethyl)-3-aminopropyltrimethoxysilane | 21.0 | Ethyltriethoxysilane | 29.0 | 50.0 |
| 11 | N-2-(Aminoethyl)-3-aminopropyltrimethoxysilane | 21.0 | n-Propyltriethoxysilane | 29.0 | 50.0 |
| 12 | N-2-(Aminoethyl)-3-aminopropyltrimethoxysilane | 21.0 | Hexyltriethoxysilane | 29.0 | 50.0 |
| 13 | N-2-(Aminoethyl)-3-aminopropyltrimethoxysilane | 21.0 | Phenyltriethoxysilane | 29.0 | 50.0 |
| 14 | N-2-(Aminoethyl)-3-aminopropyltrimethoxysilane | 21.0 | Dimethyldiethoxysilane | 29.0 | 50.0 |
| 15 | N-2-(Aminoethyl)-3-aminopropyltrimethoxysilane | 17.0 | Dimethyldiethoxysilane | 33.0 | 50.0 |
| 16 | N-Phenyl-3-aminopropyltrimethoxysilane | 21.0 | Dimethyldiethoxysilane | 29.0 | 50.0 |

Surfactant Aqueous Solution 1 Production Example

| Polyoxyethylene styrenated phenyl ether | 10.0 parts |
|---|---|
| Deionized water | 90.0 parts |

The preceding materials were introduced into a reactor equipped with a stirrer, and surfactant aqueous solution 1 was obtained by performing dissolution while stirring.

Surfactant Aqueous Solutions 2 and 3 Production Example

Surfactant aqueous solutions 2 and 3 were obtained by carrying out dissolution proceeding as in the Surfactant Aqueous Solution 1 Production Example, but respectively changing the surfactant as shown in Table 3.

TABLE 3

| Surfactant aqueous solution | Surfactant Type | Surfactant mass [parts] | Deionized water mass [parts] |
|---|---|---|---|
| 1 | Polyoxyethylene styrenated phenyl ether | 10.0 | 90.0 |
| 2 | Sodium dodecylbenzenesulfonate | 10.0 | 90.0 |
| 3 | Lauryltrimethylammonium chloride | 10.0 | 90.0 |

Magnetic Carrier 1 Production Example

Step 1 (Priming Step)

| Magnetic core particle 1 | 100.0 parts |
|---|---|
| Vinyl polymer solution 1 (10 mass % solids fraction) | 15.0 parts |

These materials were introduced into a planetary motion mixer (Model VN Nauta Mixer, Hosokawa Micron Corporation), and stirring was performed while operating the screw-shaped stirring blade at 3.5 revolutions per minute and 100 rotations per minute, injecting nitrogen at a flow rate of 0.1 m³/min, and adjusting to reduced pressure (75 mmHg). After heating to a temperature of 70° C., the coating process was carried out for 20 minutes to perform priming.

This was followed by transfer to a mixer that had a spiral blade within a rotatable mixing container (Model UD-AT drum mixer, Sugiyama Heavy Industrial Co., Ltd.), and a heat treatment was run for 2 hours at a temperature of 150° C. under a nitrogen atmosphere while stirring with rotation of the mixing container at 10 rotations per minute. The weakly magnetic product was then separated by magnetic sorting; passage through a screen with an aperture of 70 μm was performed; and classification with a wind force classifier was subsequently carried out to obtain a primed magnetic core particle 1 having a 50% particle diameter on a volume basis (D50) of 40.2 μm.

Step 2 (Slurrying Step)

Primed magnetic core particle 1: 15.0 parts
Dispersion stabilizer aqueous solution 1: 100.0 parts
Surfactant aqueous solution 1: 0.8 parts These materials were introduced into a thermometer-equipped reactor. While keeping the contents of the reactor at 25° C., dispersion was performed for 6 minutes at 5000 rpm using a homogenizer (Ultra-Turrax T50, IKA Japan Co., Ltd.) to obtain a primed magnetic core particle dispersion 1.

Step 3 (Condensation Step)

Primed magnetic core particle dispersion 1: 100.0 parts
Silane compound hydrolysis solution 1: 1.8 parts These materials were introduced into a reactor equipped with a stirrer and thermometer. The temperature was raised to 70° C. while stirring the reactor at 200 rpm. The pH of this was adjusted to 9.0 using a 1 mon aqueous NaOH solution, and a condensation reaction was run by stirring for 240 minutes. The pH was then adjusted to 1.5 using dilute hydrochloric acid to remove the dispersion stabilizer. This was followed by filtration using Kiriyama filter paper (No. 5C: 1 μm pore diameter) and the particles were separated from the filtrate. The obtained particles were washed with deionized water and were vacuum dried for 24 hours at 30° C. to obtain magnetic carrier 1.

The resulting magnetic carrier 1 had an ST3 of 0.70, a silicon atom concentration of 23.4 atom %, an ST3/SX2 of 2.4, and an arithmetic mean surface roughness Ra of 100 nm.

Magnetic Carriers 2 to 36 Production Example

Magnetic carriers 2 to 36 were obtained by carrying out the same procedure as in the Magnetic Carrier 1 Production Example, but changing the magnetic core particle, vinyl polymer solution, amount of addition of the vinyl polymer solution, surfactant aqueous solution, amount of addition of the surfactant aqueous solution, silane compound hydrolysis solution, amount of addition of the silane compound hydrolysis solution, and pH as shown in Table 4 and 5. The properties are given in Table 4 and 5.

TABLE 4

| | Primer step | | | Slurrying step | | Condensation step Silane | | |
|---|---|---|---|---|---|---|---|---|
| Magnetic carrier No. | Magnetic core particle No. | Vinyl polymer solution No | parts | Surfactant aqueous solution No. | parts | compound hydrolysis solution No. | parts | pH |
| 1 | 1 | 1 | 15 | 1 | 0.8 | 1 | 1.8 | 9.0 |
| 2 | 2 | 1 | 15 | 1 | 0.8 | 1 | 1.8 | 9.0 |
| 3 | 3 | 1 | 15 | 1 | 0.8 | 1 | 1.8 | 9.0 |
| 4 | 3 | 1 | 15 | 1 | 1.2 | 2 | 1.8 | 9.0 |
| 5 | 3 | 1 | 15 | 1 | 1 | 3 | 1.8 | 9.0 |

TABLE 4-continued

| | Primer step | | | Slurrying step | | Condensation step | | |
| | | | | | | Silane | | |
| Magnetic carrier No. | Magnetic core particle No. | Vinyl polymer solution No | parts | Surfactant aqueous solution No. | parts | compound hydrolysis solution No. | parts | pH |
|---|---|---|---|---|---|---|---|---|
| 6  | 3 | 1 | 15  | 2 | 0.8 | 1  | 1.8 | 9.0 |
| 7  | 3 | 1 | 15  | 3 | 0.8 | 1  | 1.8 | 9.0 |
| 8  | 3 | 1 | 15  | — | —   | 1  | 1.8 | 9.0 |
| 9  | 3 | 1 | 13  | — | —   | 1  | 1.8 | 9.0 |
| 10 | 3 | 1 | 10  | — | —   | 1  | 1.8 | 9.0 |
| 11 | 3 | 1 | 1   | — | —   | 1  | 1.8 | 9.0 |
| 12 | 3 | 1 | 20  | — | —   | 1  | 1.8 | 9.0 |
| 13 | 3 | 1 | 0.5 | — | —   | 1  | 1.8 | 9.0 |
| 14 | 3 | 1 | 21  | — | —   | 1  | 1.8 | 9.0 |
| 15 | 3 | 2 | 21  | — | —   | 1  | 1.8 | 9.0 |
| 16 | 3 | 3 | 21  | — | —   | 1  | 1.8 | 9.0 |
| 17 | 3 | — | —   | — | —   | 1  | 1.8 | 9.0 |
| 18 | 3 | — | —   | — | —   | 4  | 1.8 | 9.0 |
| 19 | 3 | — | —   | — | —   | 5  | 1.8 | 9.0 |
| 20 | 3 | — | —   | — | —   | 6  | 1.8 | 9.0 |
| 21 | 3 | — | —   | — | —   | 7  | 3   | 9.0 |
| 22 | 3 | — | —   | — | —   | 8  | 1.8 | 9.0 |
| 23 | 3 | — | —   | — | —   | 9  | 3   | 9.0 |
| 24 | 3 | — | —   | — | —   | 10 | 3   | 9.0 |
| 25 | 3 | — | —   | — | —   | 11 | 3   | 9.0 |
| 26 | 3 | — | —   | — | —   | 12 | 3   | 9.0 |
| 27 | 3 | — | —   | — | —   | 13 | 3   | 9.0 |
| 28 | 3 | — | —   | — | —   | 13 | 3   | 8.5 |
| 29 | 3 | — | —   | — | —   | 13 | 5   | 9.0 |
| 30 | 3 | — | —   | — | —   | 13 | 1   | 9.0 |
| 31 | 3 | — | —   | — | —   | 14 | 3   | 9.0 |
| 32 | 3 | — | —   | — | —   | 13 | 3   | 8.0 |
| 33 | 3 | — | —   | — | —   | 13 | 5.2 | 9.0 |
| 34 | 3 | — | —   | — | —   | 13 | 0.9 | 9.0 |
| 35 | 3 | — | —   | — | —   | 15 | 3   | 9.0 |
| 36 | 3 | — | —   | — | —   | 16 | 3   | 9.0 |

TABLE 5

| | Properties | | | | | |
| Magnetic carrier No. | ST3 [-] | SiC [atom %] | ST3/SX2 [-] | Ra [nm] | RSm [nm] | σ/RSm |
|---|---|---|---|---|---|---|
| 1  | 0.70 | 23.4 | 2.4 | 100  | 125 | 0.45 |
| 2  | 0.70 | 23.4 | 2.4 | 100  | 125 | 0.45 |
| 3  | 0.70 | 23.4 | 2.4 | 100  | 125 | 0.45 |
| 4  | 0.70 | 23.4 | 2.4 | 100  | 125 | 0.45 |
| 5  | 0.70 | 23.4 | 2.4 | 100  | 125 | 0.45 |
| 6  | 0.70 | 23.4 | 2.4 | 100  | 125 | 0.45 |
| 7  | 0.70 | 23.4 | 2.4 | 100  | 125 | 0.45 |
| 8  | 0.70 | 23.4 | 2.4 | 100  | 125 | 0.45 |
| 9  | 0.70 | 23.4 | 2.4 | 100  | 125 | 0.45 |
| 10 | 0.70 | 23.4 | 2.4 | 100  | 125 | 0.45 |
| 11 | 0.70 | 23.4 | 2.4 | 100  | 125 | 0.45 |
| 12 | 0.70 | 23.4 | 2.4 | 100  | 125 | 0.45 |
| 13 | 0.70 | 23.4 | 2.4 | 100  | 125 | 0.45 |
| 14 | 0.70 | 23.4 | 2.4 | 100  | 125 | 0.45 |
| 15 | 0.70 | 23.4 | 2.4 | 100  | 125 | 0.45 |
| 16 | 0.70 | 23.4 | 2.4 | 100  | 125 | 0.45 |
| 17 | 0.70 | 23.4 | 2.4 | 100  | 125 | 0.45 |
| 18 | 0.70 | 23.4 | 2.4 | 10   | 125 | 0.45 |
| 19 | 0.70 | 23.4 | 2.4 | 200  | 125 | 0.45 |
| 20 | 0.70 | 23.4 | 2.4 | 250  | 125 | 0.45 |
| 21 | 0.70 | 23.4 | 2.4 | 2000 | 125 | 0.45 |
| 22 | 0.70 | 23.4 | 2.4 | 8    | 125 | 0.45 |
| 23 | 0.70 | 23.4 | 2.4 | 2100 | 125 | 0.45 |
| 24 | 0.70 | 23.4 | 1.1 | 2100 | 125 | 0.45 |
| 25 | 0.70 | 23.4 | 0.9 | 2100 | 125 | 0.45 |
| 26 | 0.70 | 2.7  | 0.8 | 2100 | 125 | 0.45 |
| 27 | 0.70 | 2.4  | 0.7 | 2100 | 125 | 0.45 |
| 28 | 0.70 | 2.4  | 0.7 | 2100 | 125 | 0.80 |
| 29 | 0.70 | 2.4  | 0.7 | 2100 | 20  | 0.45 |
| 30 | 0.70 | 2.4  | 0.7 | 2100 | 500 | 0.45 |
| 31 | 0.05 | 2.4  | 0.9 | 2100 | 125 | 0.45 |
| 32 | 0.70 | 2.4  | 0.7 | 2100 | 125 | 0.81 |
| 33 | 0.70 | 2.4  | 0.7 | 2100 | 19  | 0.45 |
| 34 | 0.70 | 2.4  | 0.7 | 2100 | 510 | 0.45 |
| 35 | 0.04 | 2.4  | 0.9 | 2010 | 125 | 0.45 |
| 36 | 0.05 | 2.4  | 0.9 | 2010 | 125 | 0.45 |

In the table, "parts" indicates amount of addition, "SiC" indicates silicon atom concentration.

Silicone Resin Solution 1 Production Example

Silicone varnish (KR255, Shin-Etsu Chemical Co., Ltd.) (20 mass % solids fraction) 100.0 parts Solvent: toluene 100.0 parts These materials were introduced into a stirrer-equipped reactor and mixing was carried out for 1 hour to obtain a silicone resin solution 1 (10 mass % solids fraction).

Magnetic Carrier 37 Production Example

| Coating Step | |
|---|---|
| Magnetic core particle 3 | 100.0 parts |
| Silicone resin solution 1 (10 mass % solids fraction) | 30.0 parts |

These materials were introduced into a planetary motion mixer (Model VN Nauta Mixer, Hosokawa Micron Corporation), and stirring was performed while operating the screw-shaped stirring blade at 3.5 revolutions per minute and 100 rotations per minute, injecting nitrogen at a flow rate of 0.1 m$^3$/min, and adjusting to reduced pressure (75 mmHg). After heating to a temperature of 70° C., the coating process was carried out for 20 minutes to perform coating.

This was followed by transfer to a mixer that had a spiral blade within a rotatable mixing container (Model UD-AT drum mixer, Sugiyama Heavy Industrial Co., Ltd.), and a heat treatment was run for 2 hours at a temperature of 150° C. under a nitrogen atmosphere while stirring with rotation of the mixing container at 10 rotations per minute. The weakly magnetic product was then separated by magnetic sorting; passage through a screen with an aperture of 70 μm was performed; and classification with a wind force classifier was carried out to obtain a magnetic carrier 37 having a 50% particle diameter on a volume basis (D50) of 40.2 μm.

Magnetic carrier 31 had an ST3 of 0.00, a silicon atom concentration of 10.5 atom %, an ST3/SX2 of 0.0, and an arithmetic mean surface roughness Ra of 15 nm.

Methylolmelamine Solution 1 Production Example

Melamine powder 100.0 parts
37% formalin 260.0 parts
Deionized water 300.0 parts These materials were introduced into a reactor equipped with a stirrer and thermometer; the temperature was raised to 60° C.; and mixing was then carried out for 1 hour to obtain a transparent methylolmelamine solution 1 (30 mass % solids fraction).

Magnetic Carrier 38 Production Example

| Coating Step | |
|---|---|
| Magnetic core particle 2 | 100.0 parts |
| Methylolmelamine solution 1 (30 mass % solids fraction) | 10.0 parts |

These materials were introduced into a planetary motion mixer (Model VN Nauta Mixer, Hosokawa Micron Corporation); heating was performed to a temperature of 85° C.; an aqueous glacial acetic acid solution was then added as an acidic catalyst; and stirring was performed while operating the screw-shaped stirring blade at 3.5 revolutions per minute and 100 rotations per minute and a coating operation was carried out for 20 minutes to perform coating.

This was followed by transfer to a mixer that had a spiral blade within a rotatable mixing container (Model UD-AT drum mixer, Sugiyama Heavy Industrial Co., Ltd.), and a heat treatment was run for 2 hours at a temperature of 150° C. under a nitrogen atmosphere while stirring with rotation of the mixing container at 10 rotations per minute. The weakly magnetic product was then separated by magnetic sorting; passage through a screen with an aperture of 70 μm was performed; and classification with a wind force classifier was carried out to obtain a magnetic carrier 38 having a 50% particle diameter on a volume basis (D50) of 40.2 μm.

Magnetic carrier 32 had an ST3 of 0.00, a silicon atom concentration of 0.0 atom %, an ST3/SX2 of 0.0, and an arithmetic mean surface roughness Ra of 15 nm.

Amorphous Resin 1 Production Example

Polyoxypropylene(2.2)-2,2-bis(4-hydroxyphenyl)propane: 73.8 parts (0.19 mol, 100.0 mol % with respect to the total number of moles of polyhydric alcohol)

Terephthalic acid: 12.5 parts
(0.08 mol, 48.0 mol % with respect to the total number of moles of polybasic carboxylic acid)

Adipic acid: 7.8 parts
(0.05 mol, 34.0 mol % with respect to the total number of moles of polybasic carboxylic acid)

Titanium tetrabutoxide (esterification catalyst): 0.5 parts

These materials were metered into a reactor equipped with a condenser, stirrer, nitrogen introduction line, and thermocouple. The interior of the flask was then substituted with nitrogen gas, the temperature was subsequently gradually raised while stirring, and a reaction was run for 2 hours while stirring at a temperature of 200° C.

The pressure in the reactor was dropped to 8.3 kPa, and, after holding for 1 hour, cooling to 160° C. was carried out and the system was returned to atmospheric pressure (first reaction step).

Trimellitic acid: 5.9 parts
(0.03 mol, 18.0 mol % with respect to the total number of moles of polybasic carboxylic acid)

tert-Butylcatechol (polymerization inhibitor): 0.1 part by mass

These materials were then added, the pressure in the reactor was dropped to 8.3 kPa, a reaction was run for 15 hours while maintaining the system as such at a temperature of 200° C., and, after confirming that the softening point as measured in accordance with ASTM D 36-86 had reached a temperature of 120° C., the temperature was reduced and the reaction was stopped (second reaction step) to obtain an amorphous resin 1. The resulting amorphous resin 1 had a peak molecular weight Mp of 10000, a softening point Tm of 110° C., and a glass transition temperature Tg of 60° C.

Toner 1 Production Example

| Amorphous resin 1 | 100 parts |
|---|---|
| Fischer-Tropsch wax (peak temperature of maximum endothermic peak = 90° C.) | 4 parts |
| Carbon black | 10 parts |

These materials were mixed using a Henschel mixer (Model FM-75, Mitsui Mining Co., Ltd.) at a rotation rate of 1500 rpm and for a rotation time of 5 minutes, followed by kneading using a twin-screw kneader (Model PCM-30, Ikegai Corporation) set to a temperature of 130° C. The resulting kneaded material was cooled and coarsely pulverized to 1 mm and below using a hammer mill to obtain a coarsely pulverized material.

The resulting coarsely pulverized material was finely pulverized using a mechanical pulverizer (T-250, Turbo Kogyo Co., Ltd.). Classification was performed using a Faculty (F-300, Hosokawa Micron Corporation), yielding toner particle 1. The operating conditions were a classification rotor rotation rate of 11000 rpm and a dispersion rotor rotation rate of 7200 rpm.

| | |
|---|---|
| Toner particle 1: | 100 parts |
| Silica fine particle A: fumed silica that has been surface-treated with hexamethyldisilazane (median diameter on a numerical basis (D50) = 120 nm) | 4 parts |
| Small-diameter inorganic fine particles: titanium oxide fine particles that have been surface-treated with isobutyltrimethoxysilane (median diameter on a numerical basis (D50) = 10 nm) | 1 part |

These materials were mixed in a Henschel mixer (Model FM-75, Mitsui Miike Chemical Engineering Machinery Co., Ltd.) at a rotation rate of 1900 rpm and for a rotation time of 10 minutes to yield a negative-charging toner 1. The coverage ratio of toner 1 by the inorganic fine particles was 30%.

Toner 2 Production Example

A positive-charging toner 2 was obtained using the same procedure as in the Toner 1 Production Example, but adding 2 parts of a quaternary ammonium salt (BONTRON "P-51", Orient Chemical Industries Co., Ltd.). The coverage ratio of toner 2 by the inorganic fine particles was 30%.

Two-Component Developer 1 Production Example 92.0 parts of magnetic carrier 1 was mixed with 8.0 parts of toner 1 using a V-mixer (V-20, Seishin Enterprise Co., Ltd.) to provide the two-component developer 1.

Two-Component Developers 2 to 38 Production Example

Two-component developers 2 to 38 were obtained by carrying out the same procedure as in the Two-Component Developer 1 Production Example, but changing to the toner/magnetic carrier combinations shown in Table 6.

TABLE 6

| | Two-component developer No. | Toner No. | Magnetic carrier No. | Image-forming apparatus |
|---|---|---|---|---|
| Example 1 | 1 | 1 | 1 | Modified C5560 |
| Example 2 | 2 | 1 | 2 | Modified C5560 |
| Example 3 | 3 | 1 | 3 | Modified C5560 |
| Example 4 | 4 | 2 | 4 | Modified 406ci |
| Example 5 | 5 | 2 | 5 | Modified 406ci |
| Example 6 | 6 | 1 | 6 | Modified C5560 |
| Example 7 | 7 | 1 | 7 | Modified C5560 |
| Example 8 | 8 | 1 | 8 | Modified C5560 |
| Example 9 | 9 | 1 | 9 | Modified C5560 |
| Example 10 | 10 | 1 | 10 | Modified C5560 |
| Example 11 | 11 | 1 | 11 | Modified C5560 |
| Example 12 | 12 | 1 | 12 | Modified C5560 |
| Example 13 | 13 | 1 | 13 | Modified C5560 |
| Example 14 | 14 | 1 | 14 | Modified C5560 |
| Example 15 | 15 | 1 | 15 | Modified C5560 |
| Example 16 | 16 | 1 | 16 | Modified C5560 |
| Example 17 | 17 | 1 | 17 | Modified C5560 |
| Example 18 | 18 | 1 | 18 | Modified C5560 |
| Example 19 | 19 | 1 | 19 | Modified C5560 |
| Example 20 | 20 | 1 | 20 | Modified C5560 |
| Example 21 | 21 | 1 | 21 | Modified C5560 |

TABLE 6-continued

| | Two-component developer No. | Toner No. | Magnetic carrier No. | Image-forming apparatus |
|---|---|---|---|---|
| Example 22 | 22 | 1 | 22 | Modified C5560 |
| Example 23 | 23 | 1 | 23 | Modified C5560 |
| Example 24 | 24 | 1 | 24 | Modified C5560 |
| Example 25 | 25 | 1 | 25 | Modified C5560 |
| Example 26 | 26 | 1 | 26 | Modified C5560 |
| Example 27 | 27 | 1 | 27 | Modified C5560 |
| Example 28 | 28 | 1 | 28 | Modified C5560 |
| Example 29 | 29 | 1 | 29 | Modified C5560 |
| Example 30 | 30 | 1 | 30 | Modified C5560 |
| Example 31 | 31 | 1 | 31 | Modified C5560 |
| Comparative Example 1 | 32 | 1 | 32 | Modified C5560 |
| Comparative Example 2 | 33 | 1 | 33 | Modified C5560 |
| Comparative Example 3 | 34 | 1 | 34 | Modified C5560 |
| Comparative Example 4 | 35 | 1 | 35 | Modified C5560 |
| Comparative Example 5 | 36 | 1 | 36 | Modified C5560 |
| Comparative Example 6 | 37 | 1 | 37 | Modified C5560 |
| Comparative Example 7 | 38 | 2 | 38 | Modified 406ci |

Example 1

Evaluations were carried out using two-component developer 1.

A modified imageRUNNER ADVANCE C5560 from Canon, Inc. was used as the image-forming apparatus, and the two-component developer 1 was introduced into the developing device at the cyan position. The apparatus was modified as follows: the fixation temperature, process speed, direct-current voltage $V_{DC}$ of the developer carrying member, charging voltage $V_D$ of the electrostatic latent image bearing member, and laser power were altered so as to be freely settable. In the image output evaluation, an FFh image (solid image) with the desired image ratio was output; the $V_{DC}$, $V_D$, and laser power were adjusted to provide the desired toner laid-on level for the FFh image on the paper; and the durability test described below was run.

FFh is a value that presents 256 gradations in hexadecimal format, with 00 h being the 1st gradation (white background region) of the 256 gradations and FFh being the 256th gradation (solid region) of the 256 gradations.

Each of the evaluations was performed before and after the durability test.

10000 prints of the image described below were output in the durability test.

Paper: GFC-081 (81.0 g/m$^2$) (Canon Marketing Japan Inc.)

Toner laid-on level on the paper prior to the durability test: 0.35 mg/cm$^2$ (Adjusted prior to the durability test using the direct-current voltage $V_{DC}$ of the developer carrying member, charging voltage $V_D$ of the electrostatic latent image bearing member, and laser power. Not changed during the durability test or after the durability test.)

Evaluation image: an FFh strip chart image with an image ratio of 1% positioned in the center of the A4 paper specified above Fixing test environment: high-temperature, high-humidity environment: temperature 30° C./humidity 80% RH ("H/H" below)

Process speed: 377 mm/sec

Evaluations are performed based on the following evaluation methods, and the results are given in Table 7.

Charge Stability

Paper: GFC-081 (81.0 g/m$^2$) (Canon Marketing Japan Inc.)

Toner laid-on level on the paper prior to the durability test: 0.35 mg/cm$^2$ (Adjusted prior to the durability test using the direct-current voltage $V_{DC}$ of the developer carrying member, charging voltage $V_D$ of the electrostatic latent image bearing member, and laser power. Not changed during the durability test or after the durability test.)

Evaluation image: a 2 cm×5 cm FFh image positioned in the center of the A4 paper specified above Test environment: high-temperature, high-humidity environment: temperature 30° C./humidity 80% RH ("H/H" below)

The triboelectric charge quantity on the toner was determined by suctioning off and collecting the toner on the electrostatic latent image bearing member using a cylindrical metal tube and cylindrical filter. Specifically, the triboelectric charge quantity on the toner on the electrostatic latent image bearing member was measured using a Faraday cage.

A Faraday cage is a coaxial double cylinder wherein the inner cylinder is insulated from the outer cylinder. When a charged body carrying a charge quantity Q is introduced into this inner cylinder, due to electrostatic induction this is the same as the presence of a metal cylinder carrying charge quantity Q. This induced charge quantity was measured with an electrometer (Keithley 6517A, Keithley Instruments, Inc.), and the charge quantity Q (mC) divided by the mass M (kg) of the toner in the inner cylinder, or Q/M, was taken to be the triboelectric charge quantity of the toner.

$$\text{Triboelectric charge quantity of the toner (mC/kg)} = Q/M$$

Before the durability test, the aforementioned evaluation image was formed on the electrostatic latent image bearing member; the rotation of the electrostatic latent image bearing member was stopped prior to transfer to the intermediate transfer member; and the toner on the electrostatic latent image bearing member was suctioned off and collected using a cylindrical metal tube and a cylindrical filter and the "pre-test Q/M" was measured.

After the durability test, the same procedure as before the durability test was then undertaken and the post-durability-test charge quantity Q/M (mC/kg) per unit mass on the electrostatic latent image bearing member was measured.

The charge variation was calculated using the following formula. The resulting charge variation was evaluated using the evaluation criteria given below. An evaluation of A to D was regarded as satisfactory.

$$\text{Charge variation}=|\{(\text{pre-durability-test } Q/M \text{ per unit mass on the electrostatic latent image bearing member})/(\text{post-durability-test } Q/M \text{ per unit mass on the electrostatic latent image bearing member})\}/100|-100$$

Evaluation Criteria

A: the charge variation is less than 5%
B: the charge variation is at least 5%, but less than 10%
C: the charge variation is at least 10%, but less than 15%
D: the charge variation is at least 15%, but less than 20%
E: the charge variation is equal to or greater than 20%

Image Density Stability

Paper: GFC-081 (81.0 g/m$^2$) (Canon Marketing Japan Inc.)

Toner laid-on level on the paper prior to the durability test: 0.35 mg/cm$^2$ (Adjusted prior to the durability test using the direct-current voltage $V_{DC}$ of the developer carrying member, charging voltage $V_D$ of the electrostatic latent image bearing member, and laser power. Not changed during the durability test or after the durability test.)

Evaluation image: a 2 cm×5 cm FFh image positioned in the center of the A4 paper specified above Test environment: high-temperature, high-humidity environment: temperature 30° C./humidity 80% RH ("H/H" below)

Prior to the durability test, the aforementioned evaluation image was output and the image density A was determined by measuring the image density using an optical densitometer. After the durability test, the aforementioned evaluation image was output and the image density B was determined by measuring the image density using an optical densitometer. An X-Rite color reflection densitometer (X-Rite, Incorporated) was used for the optical densitometer.

The density variation was calculated using the following formula. The resulting density variation was evaluated using the evaluation criteria given below. An evaluation of A to D was regarded as satisfactory.

$$\text{Density variation}=|\text{image density } A - \text{image density } B|$$

Evaluation Criteria

A: the density variation is less than 0.05
B: the density variation is at least 0.05, but less than 0.10
C: the density variation is at least 0.10, but less than 0.15
D: the density variation is at least 0.15, but less than 0.20
E: the density variation is equal to or greater than 0.20

Leakage

Paper: GFC-081 (81.0 g/m$^2$) (Canon Marketing Japan Inc.)

High-temperature, high-humidity environment: temperature 30° C./humidity 80% RH ("H/H" below)

Evaluation image: a 19 cm×26 cm FFh full-side image positioned on the A4 paper specified above Test environment: high-temperature, high-humidity environment: temperature 30° C./humidity 80% RH ("H/H" below)

Prior to the durability test, 5 prints of the aforementioned evaluation image were output, and the leakage count A was determined by counting the number of blank dots with a diameter equal to or greater than 1 mm in the image. This evaluation image was then output after the durability test, and the leakage count B was determined by counting the number of blank dots with a diameter equal to or greater than 1 mm in the image.

The leakage variation was calculated using the following formula. The resulting leakage variation was evaluated using the evaluation criteria given below. An evaluation of A to D was regarded as satisfactory.

$$\text{Leakage variation}=|\text{leakage count } B - \text{leakage count } A|$$

A: less than 5
B: at least 5, but less than 10
C: at least 10, but less than 15
D: at least 15, but less than 20
E: equal to or greater than 20

Wear Performance

Both before and after the durability test, the toner and magnetic carrier were separated from the two-component developer and the abraded amount of the coating layer on the magnetic carrier was quantitated using a fluorescent x-ray analyzer. The measurement conditions are described above. The thereby determined abraded amount was evaluated using the evaluation criteria given below. An evaluation of A to D was regarded as satisfactory.

A: less than 0.5 mass %
B: at least 0.5 mass %, but less than 1.0 mass %
C: at least 1.0 mass %, but less than 1.5 mass %
D: at least 1.5 mass %, but less than 2.0 mass %
E: equal to or greater than 2.0 mass %

Example 2 to Example 31 and Comparative Example 1 to Comparative Example 7

The evaluations in Example 2 to Example 31 and Comparative Example 1 to Comparative Example 7 were carried out using the same procedures as for the evaluations in Example 1, but changing the two-component developer used as shown in Table 5. The results of the evaluations are given in Table 7.

In order to evaluate the positive-charging toner, a TASKalfa406ci from Kyocera Document Solutions Inc., which had been modified to enable the same adjustments as for the modified imageRUNNER ADVANCE C5560 from Canon, Inc., was also used as the image-forming apparatus.

In the table, "C.E." indicates Comparative Example.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-205634, filed Nov. 13, 2019, which is hereby incorporated by reference herein in its entirety.

What is claimed is:

1. A magnetic carrier, comprising:
a magnetic carrier particle comprising, in this order, a magnetic core particle, a primer layer, and a coating layer;
the primer layer comprising a vinyl polymer with a monomer unit derived from cycloalkyl (meth)acrylate; and
the coating layer comprising an organosilicon polymer with the structure $$R-Si(O_{1/2})_3 \qquad (T3)$$

where R represents an alkyl group having 1 to 6 carbons, a phenyl group, an amino group or an alkylamino group having 1 to 5 carbons, wherein

TABLE 7

| Example No. | | Charge stability | | | | Image density stability | | | | Leakage | | | | Wear performance | | |
| | | Durability | | | | Durability | | | | Durability | | | | Durability | | |
| | | pre- | post- | Variation | | pre- | post- | Variation | | pre- | post- | Variation | | pre- | post- | Variation |
| 1 | A | −35 | −35 | 0% | A | 1.35 | 1.35 | 0.00 | A | 0 | 0 | 0 | A | 0.0 | 0.1 | 0.1 |
| 2 | A | −35 | −34 | 3% | A | 1.35 | 1.34 | 0.01 | A | 0 | 0 | 0 | A | 0.0 | 0.1 | 0.1 |
| 3 | A | −35 | −35 | 0% | A | 1.35 | 1.35 | 0.00 | A | 0 | 1 | 1 | A | 0.0 | 0.1 | 0.1 |
| 4 | A | 35 | 35 | 0% | A | 1.35 | 1.35 | 0.00 | A | 0 | 1 | 1 | A | 0.0 | 0.1 | 0.1 |
| 5 | A | 35 | 35 | 0% | A | 1.35 | 1.35 | 0.00 | A | 0 | 1 | 1 | A | 0.0 | 0.1 | 0.1 |
| 6 | A | −35 | −35 | 0% | A | 1.35 | 1.34 | 0.01 | A | 0 | 2 | 2 | A | 0.0 | 0.2 | 0.2 |
| 7 | A | −35 | −35 | 0% | A | 1.35 | 1.34 | 0.01 | A | 0 | 3 | 3 | A | 0.0 | 0.2 | 0.2 |
| 8 | A | −35 | −35 | 0% | A | 1.35 | 1.33 | 0.02 | B | 0 | 5 | 5 | A | 0.0 | 0.3 | 0.3 |
| 9 | A | −35 | −34 | 3% | A | 1.35 | 1.32 | 0.03 | B | 0 | 5 | 5 | A | 0.0 | 0.4 | 0.4 |
| 10 | B | −35 | −33 | 6% | A | 1.35 | 1.31 | 0.04 | B | 0 | 5 | 5 | B | 0.0 | 0.5 | 0.5 |
| 11 | B | −35 | −33 | 6% | B | 1.35 | 1.30 | 0.05 | B | 0 | 7 | 7 | B | 0.0 | 0.8 | 0.8 |
| 12 | B | −35 | −33 | 6% | B | 1.35 | 1.30 | 0.05 | B | 0 | 7 | 7 | B | 0.0 | 0.8 | 0.8 |
| 13 | B | −35 | −33 | 6% | B | 1.35 | 1.29 | 0.06 | C | 0 | 10 | 10 | C | 0.0 | 1.0 | 1.0 |
| 14 | B | −35 | −33 | 6% | B | 1.35 | 1.29 | 0.06 | C | 0 | 10 | 10 | C | 0.0 | 1.0 | 1.0 |
| 15 | B | −35 | −33 | 6% | B | 1.35 | 1.28 | 0.07 | C | 0 | 12 | 12 | C | 0.0 | 1.3 | 1.3 |
| 16 | B | −35 | −33 | 6% | B | 1.35 | 1.27 | 0.08 | D | 0 | 15 | 15 | D | 0.0 | 1.5 | 1.5 |
| 17 | B | −35 | −33 | 6% | B | 1.35 | 1.27 | 0.08 | D | 0 | 18 | 18 | D | 0.0 | 1.8 | 1.8 |
| 18 | B | −35 | −33 | 6% | B | 1.35 | 1.26 | 0.09 | D | 0 | 18 | 18 | D | 0.0 | 1.8 | 1.8 |
| 19 | B | −35 | −33 | 6% | B | 1.35 | 1.26 | 0.09 | D | 0 | 18 | 18 | D | 0.0 | 1.8 | 1.8 |
| 20 | B | −35 | −33 | 6% | C | 1.35 | 1.25 | 0.10 | D | 0 | 18 | 18 | D | 0.0 | 1.8 | 1.8 |
| 21 | B | −35 | −33 | 6% | C | 1.35 | 1.24 | 0.11 | D | 0 | 18 | 18 | D | 0.0 | 1.8 | 1.8 |
| 22 | B | −35 | −33 | 6% | C | 1.35 | 1.23 | 0.12 | D | 0 | 18 | 18 | D | 0.0 | 1.8 | 1.8 |
| 23 | B | −35 | −33 | 6% | C | 1.35 | 1.23 | 0.12 | D | 0 | 18 | 18 | D | 0.0 | 1.8 | 1.8 |
| 24 | B | −35 | −32 | 9% | C | 1.35 | 1.22 | 0.13 | D | 0 | 18 | 18 | D | 0.0 | 1.8 | 1.8 |
| 25 | C | −35 | −31 | 13% | C | 1.35 | 1.22 | 0.13 | D | 0 | 18 | 18 | D | 0.0 | 1.8 | 1.8 |
| 26 | C | −35 | −31 | 13% | C | 1.35 | 1.21 | 0.14 | D | 0 | 18 | 18 | D | 0.0 | 1.8 | 1.8 |
| 27 | C | −35 | −31 | 13% | D | 1.35 | 1.20 | 0.15 | D | 0 | 18 | 18 | D | 0.0 | 1.8 | 1.8 |
| 28 | C | −35 | −31 | 13% | D | 1.35 | 1.18 | 0.17 | D | 0 | 18 | 18 | D | 0.0 | 1.8 | 1.8 |
| 29 | C | −35 | −31 | 13% | D | 1.35 | 1.18 | 0.17 | D | 0 | 18 | 18 | D | 0.0 | 1.8 | 1.8 |
| 30 | C | −35 | −31 | 13% | D | 1.35 | 1.17 | 0.17 | D | 0 | 18 | 18 | D | 0.0 | 1.8 | 1.8 |
| 31 | D | −35 | −30 | 17% | D | 1.35 | 1.18 | 0.18 | D | 0 | 18 | 18 | D | 0.0 | 1.8 | 1.8 |
| C.E. 1 | C | −35 | −31 | 13% | E | 1.35 | 1.14 | 0.21 | D | 0 | 18 | 18 | D | 0.0 | 1.8 | 1.8 |
| C.E. 2 | C | −35 | −31 | 13% | E | 1.35 | 1.14 | 0.21 | D | 0 | 18 | 18 | D | 0.0 | 1.8 | 1.8 |
| C.E. 3 | C | −35 | −31 | 13% | E | 1.35 | 1.14 | 0.21 | D | 0 | 18 | 18 | D | 0.0 | 1.8 | 1.8 |
| C.E. 4 | E | −35 | −28 | 25% | E | 1.35 | 1.14 | 0.21 | D | 0 | 18 | 18 | D | 0.0 | 1.8 | 1.8 |
| C.E. 5 | E | −35 | −26 | 35% | E | 1.35 | 1.15 | 0.20 | D | 0 | 18 | 18 | D | 0.0 | 1.8 | 1.8 |
| C.E. 6 | E | −35 | −24 | 46% | E | 1.35 | 1.08 | 0.27 | E | 0 | 21 | 21 | E | 0.0 | 2.1 | 2.1 |
| C.E. 7 | E | 35 | 24 | 46% | E | 1.35 | 1.08 | 0.27 | E | 0 | 21 | 21 | E | 0.0 | 2.1 | 2.1 | the ratio ST3 of the peak area for the structure of (T3) to the total peak area for the organosilicon polymer is at least 0.05 in $^{29}$Si-NMR measurement of the tetrahydrofuran-insoluble matter of the organosilicon polymer, in the roughness curve measured on the magnetic carrier particle using a scanning probe microscope, (i) the mean width (RSm) of the roughness curve elements of the magnetic carrier particle is 20 to 500 nm and (ii) the ratio (σ/RSm) is not more than 0.80, where σ is the standard deviation of the width of the region where one period of a protrusion and a recess occurs, and the ratio (dSi/[dSi+dO+dC]) is at least 2.5 atom % in x-ray photoelectron spectroscopic analysis of the magnetic carrier, where dSi is the silicon atom concentration at the magnetic carrier surface, dO is the oxygen atom concentration at the magnetic carrier surface, and dC is the carbon atom concentration at the magnetic carrier surface.

2. The magnetic carrier according to claim 1, wherein the ratio ST3/SX2 is at least 1.0 in $^{29}$Si-NMR measurement of the tetrahydrofuran-insoluble matter of the organosilicon polymer, where SX2 is a ratio of (i) the peak area of the structure for which the number of silicon-bonded $O_{1/2}$ is 2.0 to (ii) the total peak area for the organosilicon polymer.

3. The magnetic carrier according to claim 1, wherein the magnetic carrier surface has protrusions and recesses, and 10≤Ra≤2000, where Ra (nm) is the arithmetic mean surface roughness of the magnetic carrier surface.

4. The magnetic carrier according to claim 1, wherein the magnetic carrier surface has protrusions and recesses, and 10≤Ra≤200, where Ra (nm) is the arithmetic mean surface roughness of the magnetic carrier surface.

5. The magnetic carrier according to claim 1, wherein the vinyl polymer has a structure represented by

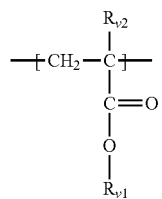

where $R_{V1}$ represents H, $CH_3$ or $C_2H_5$, and $R_{V2}$ represents H or $CH_3$.

6. The magnetic carrier according to claim 1, wherein the content of the vinyl polymer in the primer layer is 0.1 to 2.0 parts by mass per 100.0 parts by mass of the magnetic core particle.

7. The magnetic carrier according to claim 1, wherein following degradation testing by outputting 10000 prints of an image having a 1% image ratio at a process speed of 377 mm/sec using a two-component developer comprising 92.0 parts of the magnetic carrier and 8.0 parts of toner, the abraded amount of the organosilicon polymer in the coating layer is less than 2.0 mass % of the amount present prior to testing.

8. A two-component developer comprising a toner and the magnetic carrier according to claim 1.

9. The two-component developer according to claim 8, wherein the toner particle comprises inorganic fine particles on the toner particle surface, and
the coverage ratio of the toner particle surface by the inorganic fine particles is 10 to 80%.

10. A method for producing the magnetic carrier according to claim 1, method comprising the steps of:
dispersing the magnetic core particles in an aqueous medium; and
coating the magnetic core particle surface with the organosilicon polymer.

11. The magnetic carrier production method according to claim 10, wherein the aqueous medium comprises at least one compound selected from the group consisting of formulae (3-1) to (3-5)

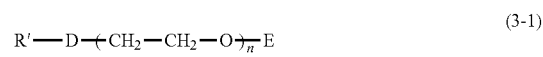

where R' is a hydrocarbon group having 3 to 30 carbons, D is a single bond, —O—, —COO—, —CONR$_{C7}$— or —NR$_{C7}$— (R$_{C7}$ is a hydrogen atom or an alkyl group having 1 to 30 carbons), E is a hydrogen atom or an acyl group having 2 to 31 carbons, and n is an integer from 1 to 60;

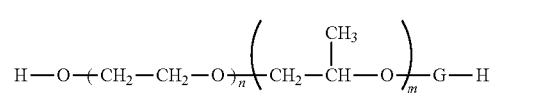

where G is a single bond or —(CH$_2$—CH$_2$—O)$_q$—, and m, n and q are independently an integer from 1 to 60;

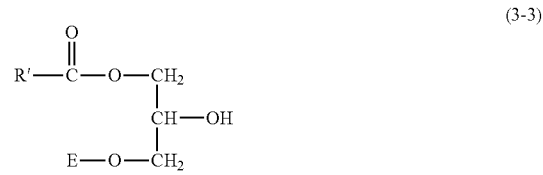

where R' is a hydrocarbon group having 3 to 30 carbons, and E is a hydrogen atom or an acyl group having 2 to 31 carbons;

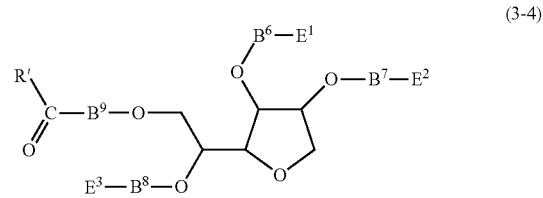

where R' is a hydrocarbon group having 3 to 30 carbons, $B^6$, $B^7$, $B^8$ and $B^9$ are independently a single bond, —(CH$_2$CH$_2$O)$_n$— or —(CH$_2$CH$_2$O)$_n$—CH$_2$—, $E^1$, $E^2$ and $E^3$ are independently a hydrogen atom or an acyl group having 2 to 31 carbons, and n is an integer from 1 to 60; and

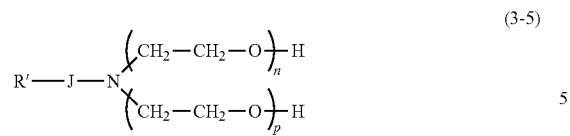 (3-5)
where R' is a hydrocarbon group having 3 to 30 carbons, J is a single bond or >C=O, n is an integer from 1 to 60, and p is an integer from 0 to 60.
* * * * *